(12) United States Patent
Hyttel

(10) Patent No.: US 12,266,458 B2
(45) Date of Patent: Apr. 1, 2025

(54) COMMON MODE CHOKE

(71) Applicant: LINAK A/S, Nordborg (DK)

(72) Inventor: Karsten Hyttel, Augustenborg (DK)

(73) Assignee: LINAK A/S, Nordborg (DK)

( * ) Notice: Subject to any disclaimer, the term of this patent is extended or adjusted under 35 U.S.C. 154(b) by 896 days.

(21) Appl. No.: 17/431,274

(22) PCT Filed: Feb. 18, 2020

(86) PCT No.: PCT/DK2020/000044
§ 371 (c)(1),
(2) Date: Aug. 16, 2021

(87) PCT Pub. No.: WO2020/169156
PCT Pub. Date: Aug. 27, 2020

(65) Prior Publication Data
US 2022/0115173 A1    Apr. 14, 2022

(30) Foreign Application Priority Data
Feb. 18, 2019    (DK) .......................... PA 2019 00215

(51) Int. Cl.
*H01F 17/06*    (2006.01)
*H01F 27/00*    (2006.01)
*H02M 1/12*    (2006.01)
*H01F 17/00*    (2006.01)

(52) U.S. Cl.
CPC ......... *H01F 17/062* (2013.01); *H01F 27/006* (2013.01); *H02M 1/126* (2013.01); *H01F 2017/0093* (2013.01)

(58) Field of Classification Search
CPC ................. H01F 17/062; H01F 27/006; H01F 2017/0093; H01F 17/06; H02M 1/126; H02M 1/123
See application file for complete search history.

(56) References Cited

U.S. PATENT DOCUMENTS 11,024,456 B2 *  6/2021  Miyamoto  ............. H01F 27/34
2017/0263372 A1   9/2017  Ashizawa et al.

FOREIGN PATENT DOCUMENTS

| CN | 202839211 U | 3/2013 |
| JP | S63198310 A | 8/1988 |
| JP | 02114608 A * | 4/1990 |
| JP | 2011082463 A | 4/2011 |

* cited by examiner

*Primary Examiner* — Tuyen T Nguyen
(74) *Attorney, Agent, or Firm* — Dykema Gossett PLLC

(57) ABSTRACT

A common mode choke (64) comprises a magnetic core (58) and a first ($W_{ab}$) and a second ($W_{cd}$) winding of insulated wire having the same number of turns wound on the magnetic core. The turns of each winding are numbered consecutively and arranged in at least two layers, of which a first layer of turns is wound directly on the magnetic core and a second layer of turns is wound around a section of the first layer. The two layers are arranged such that the difference between the highest number of a turn in the second layer and the lowest number of a turn in the section of the first layer on which the second layer is wound is less than or equal to 50% of the number of turns in the first layer. In this way, the effect of the parasitic capacitance between the layers is minimized.

8 Claims, 15 Drawing Sheets

COMMON MODE CHOKE

CROSS-REFERENCE TO RELATED APPLICATIONS

This application is a national stage filing based upon International PCT Application No. PCT/DK2020/000044, filed 18 Feb. 2020, which claims the benefit of priority to Denmark application No. PA 2019 00215, filed 18 Feb. 2019.

TECHNICAL FIELD

The invention relates to a common mode choke comprising a magnetic core and a first and a second winding of insulated wire having the same number of turns wound on the magnetic core.

BACKGROUND

Common mode chokes are widely used in industrial, electrical and telecommunications applications to remove or suppress common mode noise and related electromagnetic interference on power supply cables and signal lines.

Common mode noise, i.e. high frequency noise that is common to two or more data or power lines, may typically be radiated from sources such as unwanted radio signals, unshielded electronics, inverters and motors. If this noise is not suppressed, it can cause interference problems in electronics and electrical circuits. As an example, switched-mode power converters connected to a mains AC supply net generate high frequency noise, which may typically be transmitted via the supply lines to the mains AC supply net. However, different regulations set limits on the amount of high frequency noise transmitted to the supply net. A common mode choke can be used to reduce or cancel the common mode noise and thus prevent it from reaching the mains AC supply net.

A common mode choke comprises two or more windings or coils of insulated wire wound on a single magnetic core such that common mode currents will flow in the same winding direction. The two windings have the same number of turns, and each winding is arranged in series with one of the supply lines. By common mode noise, currents flow in the same direction through each of the two windings, thus creating equal and in-phase magnetic fields, which add together. This means that to common mode signals, the windings act as inductors, which present a high impedance to these signals and reduces the high frequency common mode noise transmitted to the supply net. However by differential mode signals, including the desired signal such as the supply current delivered to the converter, the two currents will be equal and flow in opposite directions, and the magnetic flux produced in the core by these currents will subtract and tend to cancel each other out since the windings are negative coupled. Thus, the common mode choke presents little inductance or impedance to differential mode currents. Thus, the common mode choke passes differential currents, which are equal but opposite, while it suppresses common mode currents.

Since the windings of the common mode choke act as inductors to common mode signals, the impedance of the choke increases proportionally with the inductance of the inductor as well as with the frequency of the signals applied to it. Normally, the common mode noise signals occur over a relatively broad frequency range, and thus, common mode noise signals in the higher end of the frequency range will be reduced more due to the higher impedance at these frequencies than the signals in the lower end of the frequency range.

In practice, however, a common mode choke has a more complex behaviour because of parasitic capacitance or stray capacitance between the individual turns of the windings due to their proximity to each other, and the inductor will act as though it includes a parallel capacitor. The parasitic capacitance changes the impedance of the choke by causing parallel resonance between the inductance and the capacitance at a resonance frequency, and thus the impedance of the common mode choke will show a resonance peak in its magnitude. Above the resonance frequency, the common mode choke actually has a capacitive reactance, and in this frequency range, the impedance will thus decrease, with a poor common mode noise reduction as the result. Therefore, the common mode choke should preferably be designed to have a relatively high resonance frequency, i.e. to keep the inductance and/or the capacitance in parallel to the windings low. On the other side, a high inductance is desired to ensure a good common mode noise reduction in the frequency range below the resonance frequency.

The inductance of the common mode choke is proportional to the number of turns in the windings, and thus a high inductance requires a high number of turns. In other words, a certain number of turns of the windings is required to ensure sufficiently high impedance at the lower end of the frequency range.

Depending on the size of the magnetic core, this number of turns cannot always be arranged in one layer on the core, unless the size of the core is increased. However, a larger core requires more space in the device in which the common mode choke is used, which again may result in a larger, i.e. less elegant, and more expensive enclosure of the device. Further, a larger core also increases the weight and the cost of the choke.

Therefore, the insulated wire may need to be wound in two or more layers. However, when the windings are wound in two layers, the impedance of the choke is changed significantly. The reason for this is that in addition to the parasitic capacitance or stray capacitance between neighbouring turns in each layer, there will now also be a parasitic capacitance between the layers, or more precisely between a given turn in one layer and its neighbouring turn in the other layer, i.e. the turn above or below that turn. This means that the total capacitance in parallel to each winding is increased considerably, when the windings are wound in two layers, which affects the resonance frequency and the impedance at the higher end of the frequency range negatively.

SUMMARY

Therefore, it is an object of embodiments of the invention to provide a common mode choke that can be wound in two or more layers in such a way that the increase in the capacitance in parallel to each winding caused by parasitic capacitance between the layers of the windings is minimized.

According to embodiments of the invention the object is achieved in a common mode choke comprising a magnetic core; a first winding of insulated wire having a number of turns wound on said magnetic core; and a second winding of insulated wire having the same number of turns as the first winding wound on said magnetic core, wherein the turns of each winding are numbered consecutively; and the turns of each winding are arranged in at least two layers, of which a first layer of turns is wound directly on said magnetic core and a second layer of turns is wound around a section of said first layer. The object is achieved when the two layers of each winding are arranged such that the difference between the highest number of a turn in the second layer and the lowest number of a turn in the section of the first layer on which the second layer is wound is less than or equal to 50% of the number of turns in the first layer of that winding.

When the difference between the highest number of a turn in the second layer and the lowest number of a turn in the section of the first layer on which the second layer is wound does not exceed 50% of the number of turns in the first layer of that winding, the effect of the parasitic capacitance between the layers is minimized, because the remaining turns of the first layer and the parasitic capacitances between them is still dominating in the determination of the resonance frequency and the impedance at the higher end of the frequency range. Thus, the need for a larger core of the common mode choke can be eliminated, which may result in a smaller, more elegant and less expensive enclosure of the device in which the common mode choke is used.

In an embodiment, the first layer consists of turns having consecutive numbers from turn number one to the number of turns in the first layer; the second layer consists of turns having consecutive numbers higher than the number of turns in the first layer; and the section of the first layer on which the second layer is wound comprises the highest numbered turns of the first layer. By arranging the second layer at the end of the first layer, a practical solution is achieved.

The turns of the second layer may be arranged with the lowest numbered turn wound around the highest numbered turn of the first layer and with numbers increasing in the direction away from this turn. Alternatively, the turns of the second layer may be arranged with the highest numbered turn wound around the highest numbered turn of the first layer and with numbers decreasing in the direction away from this turn.

The effect of the parasitic capacitance between the layers can be further minimized, and the resonance frequency and the impedance at the higher end of the frequency range thus further improved, when the turns of each winding are arranged in at least three layers, wherein a third layer of turns is wound around at least a section of said second layer.

In an embodiment, the first layer comprises two sections of turns, a first section consisting of turns having consecutive numbers below a first intermediate turn number and a second section consisting of turns having consecutive numbers above a second intermediate turn number, where said second intermediate turn number is higher than said first intermediate turn number; the second layer consists of turns having consecutive numbers between said first intermediate turn number and said second intermediate turn number; and the section of the first layer on which the second layer is wound comprises the highest numbered turns of the first section of the first layer. In this way, the second layer of turns can be placed in an arbitrary position on the first layer.

In an embodiment, the section of the first layer on which the second layer is wound has the same number of turns as the second layer.

The magnetic core on which the turns of the windings are wound may be a toroidal core. This type of core is available from many different suppliers. In that case, the windings may be arranged symmetrically on said toroidal core and separated from each other. This increases the leakage flux between the two windings, and the resulting leakage inductance will ensure that the common mode choke will also have some differential mode impedance, which can provide a certain differential mode suppression as well at higher frequencies.

BRIEF DESCRIPTION OF THE DRAWINGS

Embodiments of the invention will now be described more fully below with reference to the drawings, in which.

DETAILED DESCRIPTION

Figure 1:
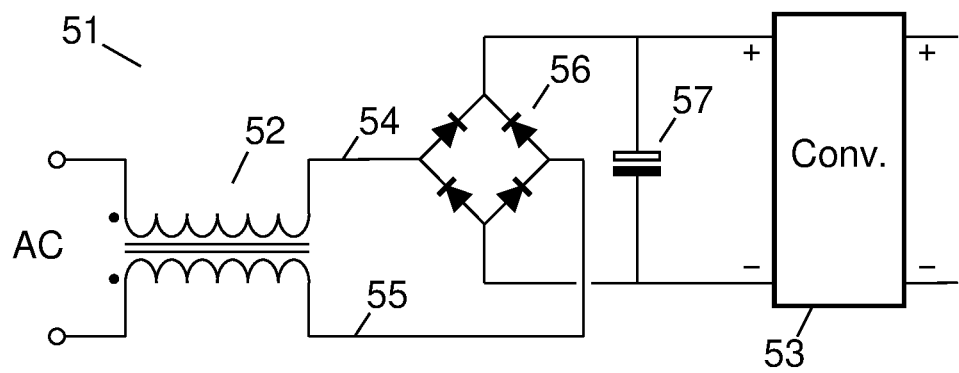
FIG. 1 shows an example of a circuit in which a common mode choke can be used.

FIG. 1 shows a diagram of an example of a circuit 51 in which a common mode choke 52 can be used. In this example, the circuit 51 is a switched-mode power supply connected to a mains AC supply net and comprising a converter 53. Switched-mode converters exist in different circuit topologies, such as flyback, boost, buck, SEPIC and forward converters. The AC voltage from the mains supply (supplied via supply lines 54 and 55) is rectified in a bridge rectifier 56 and buffered in a capacitor 57, before it is fed to a pair of input terminals of the converter 53 as its input voltage. The output voltage of the converter 53 is delivered from a pair of output terminals to a load, which could be e.g. the electric motor of a linear actuator.

The converter 53 generates high frequency noise, which may typically be transmitted via the supply lines 54 and 55 to the mains AC supply net. However, different regulations set limits on the amount of high frequency noise transmitted to the supply net. The high frequency noise generated by the converter 53 can be differential mode noise as well as common mode noise.

The differential mode noise causes a noise current to flow through one of the supply lines 54 and 55 from the converter 53, i.e. the source of the noise, to the mains AC supply net and in the opposite direction through the other one of the supply lines 54 and 55. The differential mode noise can be reduced by inserting an inductor in one (or both) of the supply lines 54 and 55 and a capacitor between them, thus creating a differential mode filter.

In contrast to the differential mode noise, the common mode noise causes similar noise currents to flow through both supply lines 54 and 55 in the same direction, e.g. from the converter 53 to the mains AC supply net. These currents will return to the converter 53 either through an explicit ground connection or through other means, such as parasitic capacitance through the air or other connections. The purpose of the common mode choke 52 is to reduce or cancel the common mode noise and thus prevent it from reaching the mains AC supply net.

Figure 2A:
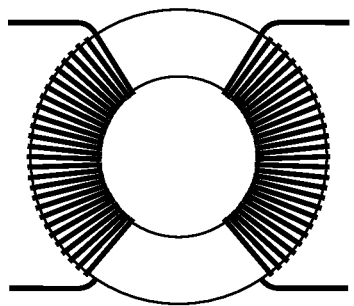
FIGS. 2a to 2c show some examples of common mode chokes using differently shaped magnetic cores.
Figure 2B:
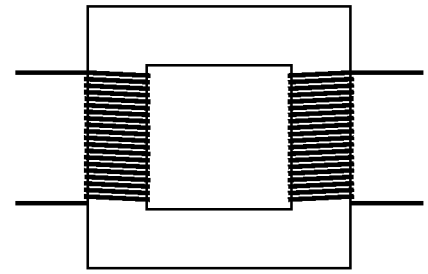
Figure 2C:
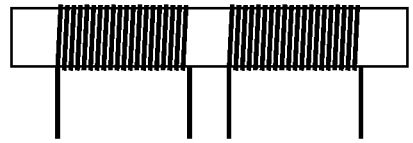

A common mode choke comprises two (or more) windings of insulated wire wound on a single magnetic core such that common mode currents, when the common mode choke is arranged as in FIG. 1, will flow in the same winding direction. The two windings have the same number of turns, and each winding is arranged in series with one of the supply lines. The magnetic core can typically be a ferrite core, but also other core types, such as iron powder cores, can be used. Also the shape of the magnetic core may be different. FIGS. 2a, 2b and 2c show some examples of common mode chokes using differently shaped magnetic cores. In FIG. 2a, the two windings of a common mode choke are arranged on a toroidal core, while a rectangular-shaped core is used in FIG. 2b, but also cores shaped as a straight cylindrical rod as shown in FIG. 2c or other shapes can be used. In the following, the toroidal core is used as an example.

The two windings can be arranged separately on the core as shown in FIGS. 2a, 2b and 2c, but also other arrangements are possible. As an example, the two windings can be arranged in two layers, so that one winding is wound in a first layer directly on the core, while the other is wound in a second layer on top of the first layer. The two windings may also be only partly overlapping. As another example, the turns of the two windings may be interleaved with each other.

Figure 3A:
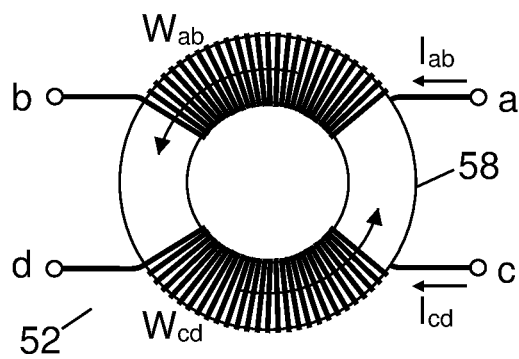
FIGS. 3a and 3b illustrate the function of a common mode choke having two windings wound on a toroidal core.
Figure 3B:
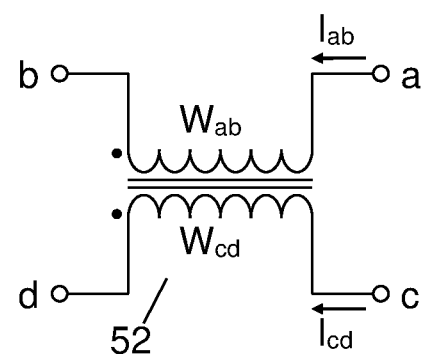

FIGS. 3a and 3b illustrate the function of the common mode choke 52 of FIG. 1 having two windings wound on a toroidal core 58. The four terminals of the choke are labelled a, b, c and d. One winding $W_{ab}$ is connected between terminals a and b, while the other winding $W_{cd}$ is connected between terminals c and d.

By common mode noise, the two currents $I_{ab}$ and $I_{cd}$ flow in the same direction through each of the two windings $W_{ab}$ and $W_{cd}$ thus creating equal and in-phase magnetic fields, which add together as illustrated with the arrows in FIG. 3a. This means that to common mode signals, the windings act as an inductor, which presents a high impedance to these signals and reduces the high frequency common mode noise transmitted to the supply net.

By differential mode signals, including the desired signal such as the supply current delivered to the converter 3, the two currents $I_{ab}$ and $I_{cd}$ will be equal and flow in opposite directions, and the magnetic flux produced in the core by these currents will subtract and tend to cancel each other out since the windings are negative coupled. Thus, the common mode choke presents little inductance or impedance to differential mode currents.

However, it is noted that in practice, the common mode choke will have some leakage flux between the two windings $W_{ab}$ and $W_{cd}$ and the resulting leakage inductance will act in series with one (or both) of the supply lines 54 and 55. Thus, the common mode choke will also have some differential mode impedance, which can provide a certain differential mode suppression as well at higher frequencies. If desired, this differential mode noise filtering can be improved by inserting a capacitor between the supply lines 54 and 55 at the supply net side of the common mode choke 52, thus creating a differential mode filter.

Figure 4A:
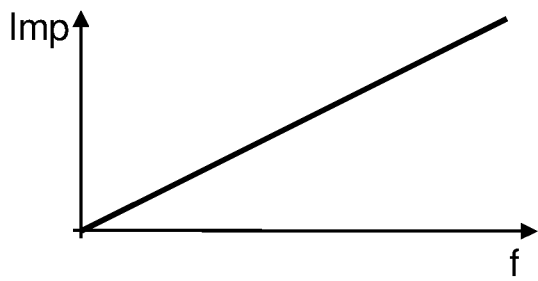
FIGS. 4a and 4b show the ideal impedance of the common mode choke as a function of the frequency and the impedance having a resonance peak in its magnitude caused by parasitic capacitance between turns of the winding.

As mentioned, each of the windings $W_{ab}$ and $W_{cd}$ acts as an inductor to common mode signals, and as it is well known, the impedance of an inductor increases proportionally with the inductance of the inductor as well as with the frequency of the signals applied to it. Normally, the common mode noise signals occur over a relatively broad frequency range, and thus, common mode noise signals in the higher end of the frequency range will be reduced more due to the higher impedance at these frequencies than the signals in the lower end of the frequency range. This is illustrated in FIG. 4a, which shows the ideal impedance of the common mode choke as a function of the frequency.

Figure 4B:
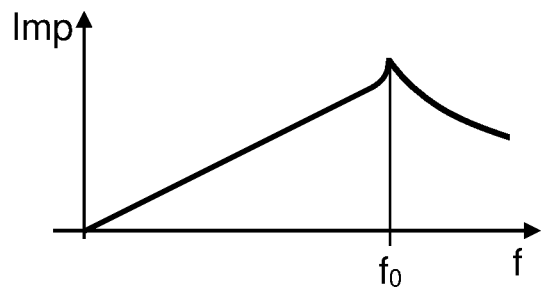

In practice, however, a common mode choke will have a more complex behaviour because of parasitic capacitance or stray capacitance between the individual turns of the windings due to their proximity to each other, and the inductor will act as though it includes a parallel capacitor. The parasitic capacitance changes the impedance of the choke by causing parallel resonance between the inductance and the capacitance at a resonance frequency $f_0$, and thus the impedance of the common mode choke will show a resonance peak in its magnitude, as it is illustrated in FIG. 4b. Above the resonance frequency $f_0$, the common mode choke actually has a capacitive reactance. Generally, the resonance frequency $f_0$ for a parallel resonance circuit having an inductor L in parallel with a capacitor C is given by $$f_0 = \frac{1}{2\pi\sqrt{LC}}.$$

Figure 5A:
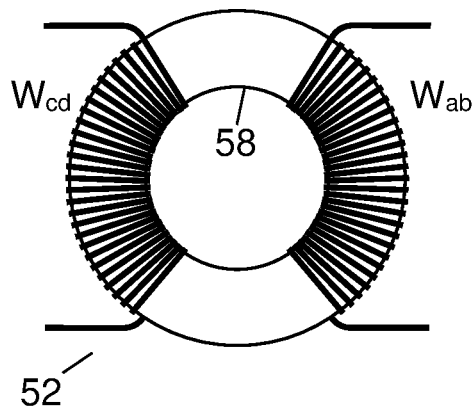
FIGS. 5a to 5c show a side view, a sectional view and an electrical diagram of a common mode choke having the turns of the windings wound in one layer.
Figure 5B:
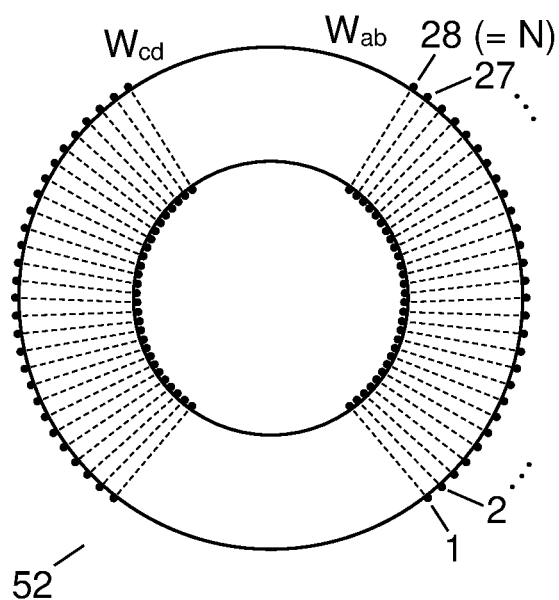
Figure 5C:
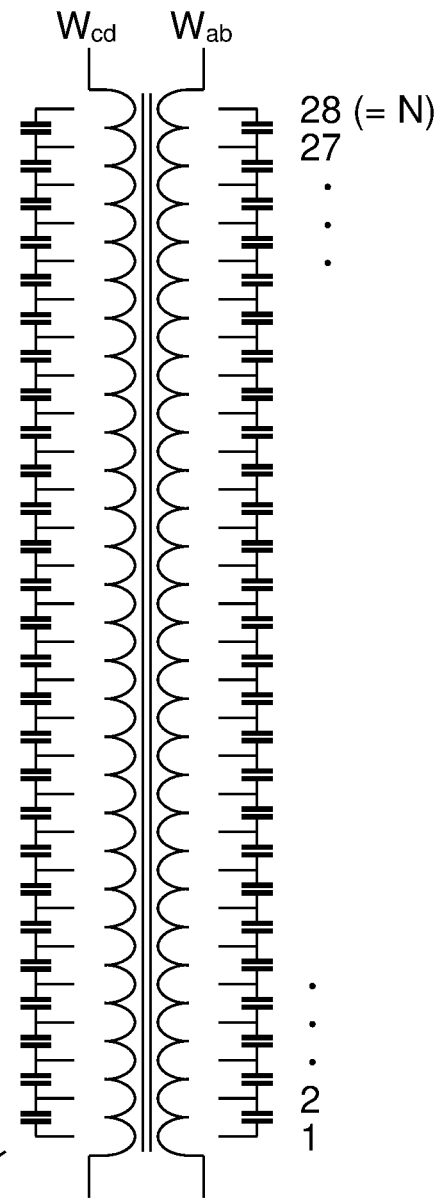

The effect of the parasitic capacitance is explained in more detail below with reference to FIGS. 5a, 5b and 5c. FIG. 5a is a side view of the common mode choke 2 corresponding to FIG. 2a or 3a showing the two windings $W_{ab}$ and $W_{cd}$, where the turns of each winding are arranged in one layer on the magnetic core 58. FIG. 5b shows a corresponding sectional view illustrating how the turns of the windings may be numbered consecutively from 1 to N (where N in the figure is chosen to 28). Thus, each winding has N turns. In other words, the turns are numbered consecutively in the order they were wound during production of the choke. FIG. 5c shows the corresponding electrical diagram of the choke, where the parasitic capacitance as an approximation is illustrated as a small capacitor connected across each turn of the windings.

As an approximation, the inductance $L_N$ of one of the windings $W_{ab}$ and Ma having N turns can be considered as being proportional to the expression $N^2$ A/l, where A is the cross section area of the winding and l is the length of the winding. It is noted that since the windings of the common mode choke 52 are arranged in one layer, the length l is proportional to N, so that in this case, the inductance $L_N$ can be considered as being proportional to the number of turns N.

Correspondingly, if the parasitic capacitance between two neighbouring turns is $C_{turn}$, the total capacitance in parallel to the winding is $C_{turn}/(N-1)$. Thus, the resonance frequency $f_0$ for one of the windings $W_{ab}$ and $W_{cd}$ of the common mode choke 52 in FIGS. 5a, 5b and 5c can be determined by $$f_{0(52)} = \frac{1}{2\pi\sqrt{L_N C_{turn}/(N-1)}} = \frac{1}{2\pi\sqrt{\frac{1}{N-1}L_N C_{turn}}}.$$

In FIGS. 5a, 5b and 5c, each winding is shown as having 28 turns as an example, and thus for this example, N=28, and the inductance of one of the windings is $L_{28}$, the total capacitance in parallel to the winding is $C_{turn}/27$, and the resonance frequency $f_0$ will be $$f_{0(52)} = \frac{1}{2\pi\sqrt{\frac{1}{27}L_{28}C_{turn}}}.$$

It was mentioned above, and it can also be seen from FIG. 4b, that below the resonance frequency $f_0$, the impedance of the windings of the common mode choke increases proportionally with the frequency of the noise signals. Thus, common mode noise signals in the higher end of this frequency range (i.e. below the resonance frequency $f_0$) will be reduced more due to the higher impedance at these frequencies than signals in the lower end of the frequency range. The impedance also increases proportionally with the inductance of the windings, and therefore, to ensure sufficiently high impedance at the lower end of the frequency range, the inductance must be sufficiently high. Since the inductance increases with the number of turns of the windings, a certain number of turns of the windings is required to ensure sufficiently high impedance at the lower end of the frequency range.

Figure 6A:
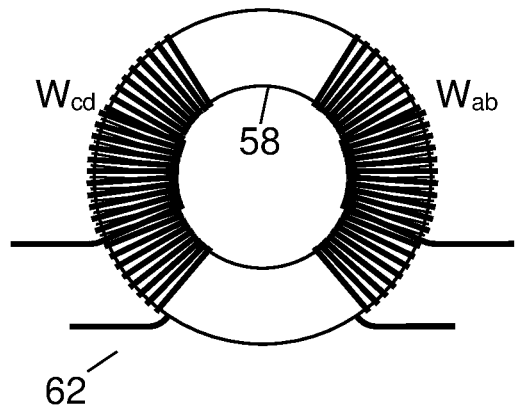
FIGS. 6a to 6e show a side view, sectional views, an electrical diagram and the impedance as a function of the frequency of a common mode choke having the turns of the windings wound in two layers according to prior art.
Figure 6B:
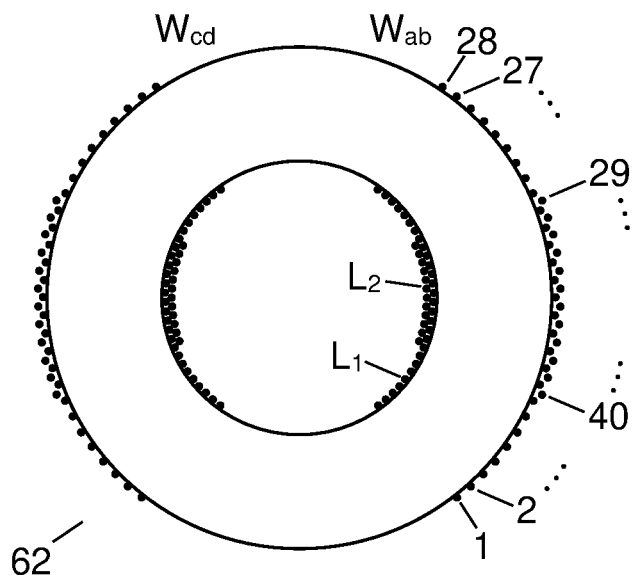
Figure 6C:
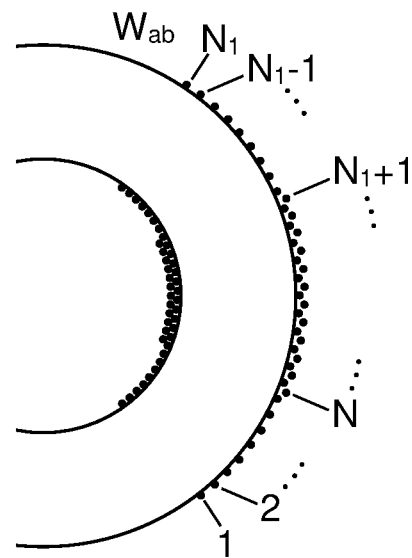

Depending on the size of the magnetic core 58, this number of turns cannot always be arranged in one layer on the core, and therefore, the insulated wire may need to be wound in two or more layers. Typically, the turns of a second layer are distributed over the full length of the first layer wound directly on the core, or the second layer is arranged near the middle of the first layer. An example of this is shown in FIG. 6a illustrating a common mode choke 62, where each of the windings $W_{ab}$ and $W_{cd}$ has a total of N=40 turns arranged with $N_1$=28 turns in a first layer $L_1$ wound directly on the core and $N_2$=12 turns in a second layer $L_2$ wound on top of the first layer. A corresponding sectional view illustrating how the turns of the first layer $L_1$ are numbered consecutively from 1 to 28 and the turns of the second layer $L_2$ are numbered from 29 to 40 is shown in FIG. 6b. Again, it is seen that the turns are numbered consecutively in the order they were wound during production of the choke. The more general case with $N_1$ turns in the first layer $L_1$ and $N_2$ turns in the second layer $L_2$ is illustrated in FIG. 6c.

However, the fact that the windings are now wound in two layers means that the impedance of the choke is changed significantly. The reason for this is that in addition to the parasitic capacitance or stray capacitance between neighbouring turns in each layer mentioned above, there will now also be a parasitic capacitance between a given turn in one layer and its neighbouring turn in the other layer, i.e. the turn above or below that turn. Thus, as an example, it can be seen in FIG. 6b that turn number 29 is arranged above turn number 20 in the first layer, and due to their proximity to each other there will be a parasitic capacitance between these turns having approximately the same size as the parasitic capacitance $C_{turn}$ between two neighbouring turns in the same layer. Similarly, there will be a parasitic capacitance between turn number 30 and turn number 19, between turn number 31 and turn number 18, and so on. Theoretically, there will also be a parasitic capacitance between e.g. turn number 29 and the turns 19 and 21 in the first layer, but due to the larger distance, these capacitances can be considered as negligible compared to the capacitance between turns arranged directly above each other.

Figure 6E:
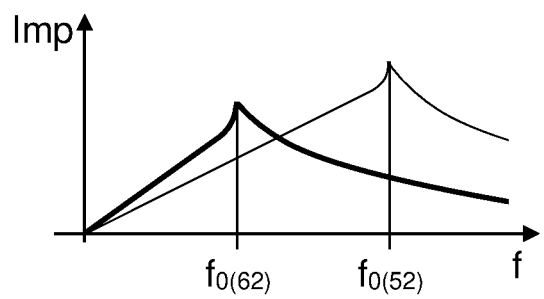
Figure 6D:
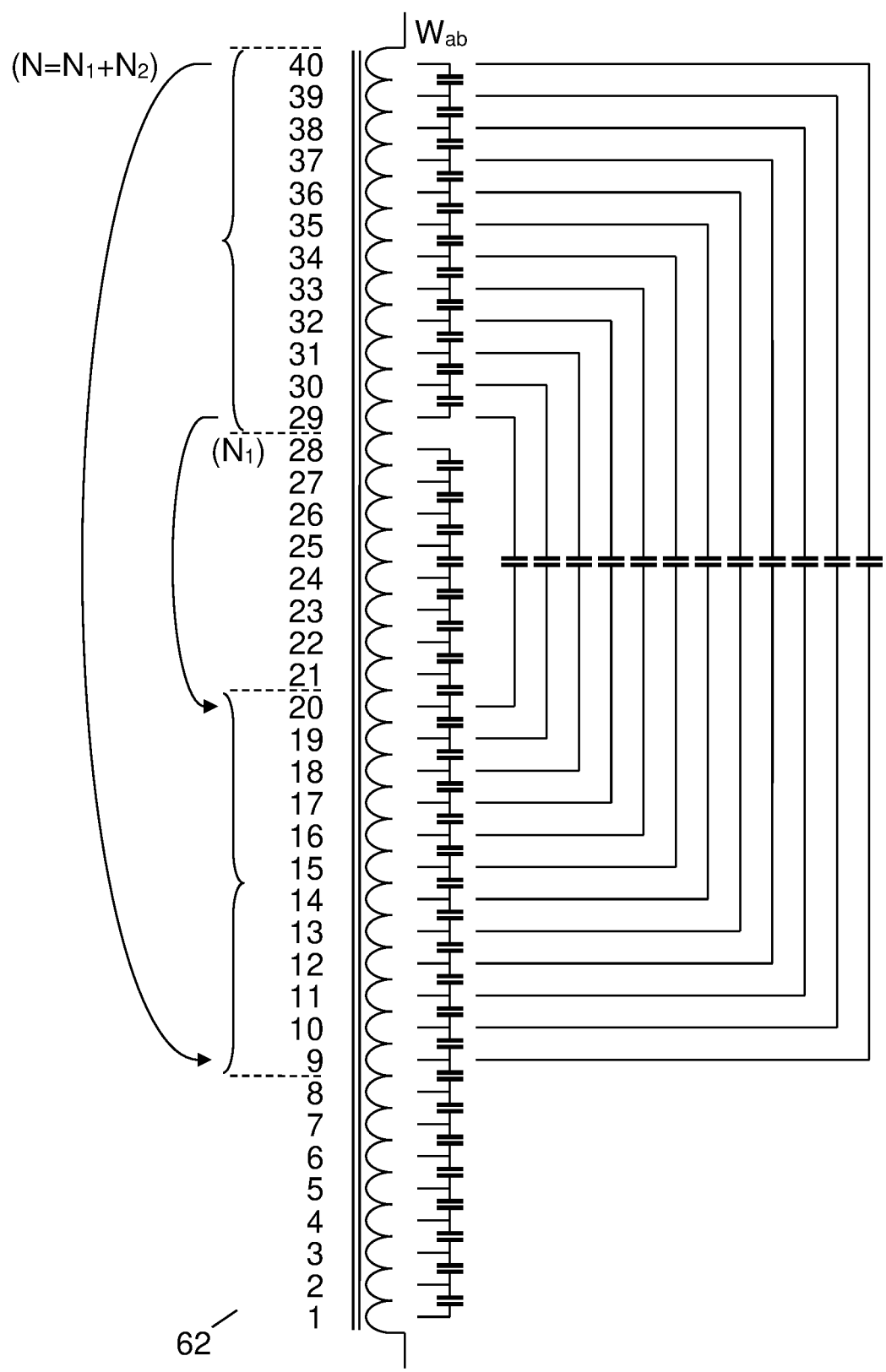

This is illustrated in FIG. 6d showing the corresponding electrical diagram of the choke 62, where the parasitic capacitances between neighbouring turns in the same layer as well as those between turns of different layers are shown. Also here, the turns are numbered consecutively from 1 to 40. All the shown parasitic capacitances are considered as having the capacitance value $C_{turn}$. For reasons of clarity and simplicity, only the winding $W_{ab}$ and the capacitors indicating the parasitic capacitances for this winding are shown. The diagram for winding $W_{cd}$ is similar. The presence of the additional parasitic capacitances between turns in the first layer and turns in the second layer results in a large combination of series/parallel-coupled capacitors as shown in FIG. 6d, which changes the impedance of the choke significantly, because the total capacitance in parallel to the winding of the common mode choke 62 is considerably increased compared to that of the choke 52 of FIGS. 5a-5c.

When calculating the resulting capacitance of the large combination of series/parallel-coupled capacitors, the capacitor of size $C_{turn}$ indicating the parasitic capacitance between turn number 40 (i.e. the highest number of a turn in the second layer $L_2$) and turn number 9 (i.e. the lowest number of a turn in the section of the first layer $L_1$ on which the second layer of turns is wound) will be the dominating capacitance. Actually, the resulting capacitance of the combination can be calculated to be approximately 4/3 $C_{turn}$. Thus, the total capacitance in parallel to the winding $W_{ab}$ of the common mode choke 62 is a series connection of eight capacitors of size $C_{turn}$ and one capacitor of size 4/3 $C_{turn}$. This can be calculated to 4/35 $C_{turn}$, which is so close to 1/9 $C_{turn}$ that the resulting capacitance of the large combination of series/parallel-coupled capacitors could just as well be approximated to $C_{turn}$. This approximation will be used in the following.

Of course, this increase in the total capacitance in parallel to the winding $W_{ab}$ of the common mode choke 62 compared to the choke 52 of FIGS. 5a-5c affects the resonance frequency. Each winding now has 40 turns, and because the length l of the windings is the same as the windings of the choke 52, the inductance $L_{40}$ of one of the windings of the choke 62 is $L_{40}=(40/28)^2 L_{28}$, while the total capacitance in parallel to the winding as mentioned can be approximated to $C_{turn}/9$. The resonance frequency $f_0$ for the choke 62 will thus be $$f_{0(62)} = \frac{1}{2\pi\sqrt{\frac{1}{9}\left(\frac{40}{28}\right)^2 L_{28} C_{turn}}}.$$

This means that the common mode choke 62 has a resonance frequency around 0.40 times the resonance frequency of the choke 52. FIG. 6e shows the impedance of the common mode choke 62 (thick line) as a function of the frequency compared to the impedance of the common mode choke 52 (thin line) from FIG. 4a. It is clearly seen that due to the higher number of turns, the choke 62 has a higher impedance (and thus a better reduction of common mode noise signals) in the lower end of the frequency range, as it was also intended. However, on the other hand, it has a much lower impedance (and thus a poor reduction of common mode noise signals) in the higher end of the frequency range, which is due to the higher total capacitance in parallel to the winding. It is noted that the curves on FIG. 6e are not drawn to scale, and thus the figure only intends to indicate the effects of arranging the turns of the windings on the magnetic core as described. This is also the case for FIGS. 8d, 9d, 10d, 11d and 12d mentioned in the following.

Figure 7:
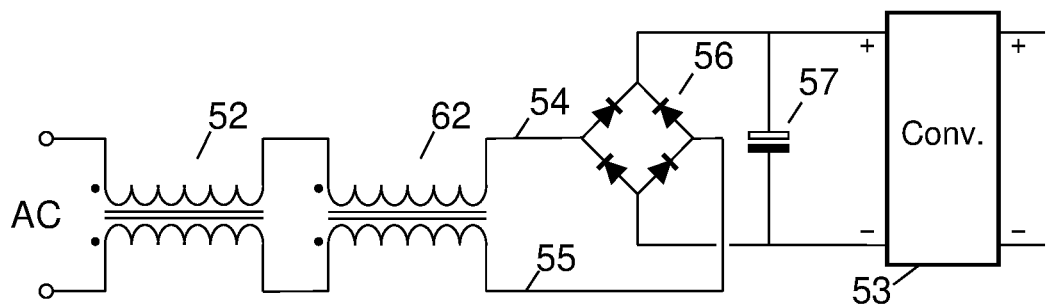
FIG. 7 shows an example of a circuit in which two common mode chokes according to prior art are used to achieve sufficient common mode noise reduction.

In other words, the common mode choke 52 with 28 turns in each winding has a good common mode noise reduction at higher frequencies and a poor common mode noise reduction at lower frequencies, while it is the other way round for the common mode choke 62 with 40 turns in each winding. To get a sufficient common mode noise reduction in the whole frequency range, it is therefore well known to arrange two such common mode chokes in series, as it is shown in FIG. 7. In this way, the two impedance curves in FIG. 6e are added together, and a good common mode noise reduction is achieved in a much broader frequency range. However, since this solution requires the use of an additional component in the form of the second common mode choke, the result is increased space requirements e.g. on a printed circuit board as well as increased costs.

Looking at FIG. 6d, it can be seen that turns in the second layer $L_2$ and turns arranged in the first layer $L_1$ below the second layer $L_2$ (and thus coupled to each other with parasitic capacitances) may have a considerable difference between their consecutive numbers. As it was seen above, the resulting capacitance of the large combination of series/parallel-coupled capacitors is determined by the difference between the highest number of a turn in the second layer and the lowest number of a turn in the section of the first layer on which the second layer of turns is wound. This is a reason for the large increase in the total capacitance in parallel to the winding $W_{ab}$ of the common mode choke 62. Thus, in the example above, the parasitic capacitance between turn number 40 and turn number 9, which spans over 31 turns, is dominating in the resulting capacitance of the large combination of series/parallel-coupled capacitors, and only the eight parasitic capacitances between turns 1 to 9 are left to be in series with the combination.

Therefore, as it is described in the following, it can be seen that the total capacitance in parallel to each winding can be reduced by arranging the two layers such that the difference between the highest number of a turn in the second layer $L_2$ and the lowest number of a turn in the section of the first layer $L_1$ on which the second layer $L_2$ of turns is wound is kept as small as possible.

Examples of how this can be done are illustrated in FIGS. 8a-8d and 9a-9d. FIGS. 8a-8d show a common mode choke 63 having 32 turns arranged with 28 turns in the first layer $L_1$ and 4 turns in the second layer $L_2$, while FIGS. 9a-9d show a common mode choke 64 having 35 turns arranged with 28 turns in the first layer $L_1$ and 7 turns in the second layer $L_2$.

Figure 8A:
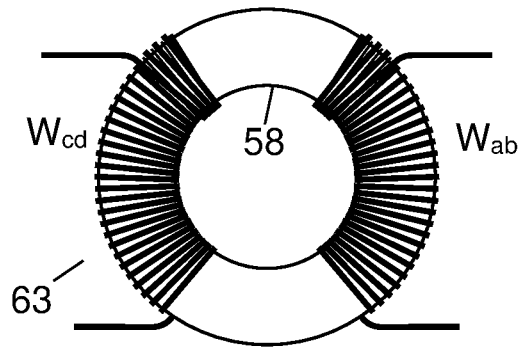
FIGS. 8a to 8h show side views, sectional views, electrical diagrams and the impedance as a function of the frequency of a common mode choke having the turns of the windings wound in two layers according to the invention.
Figure 8B:
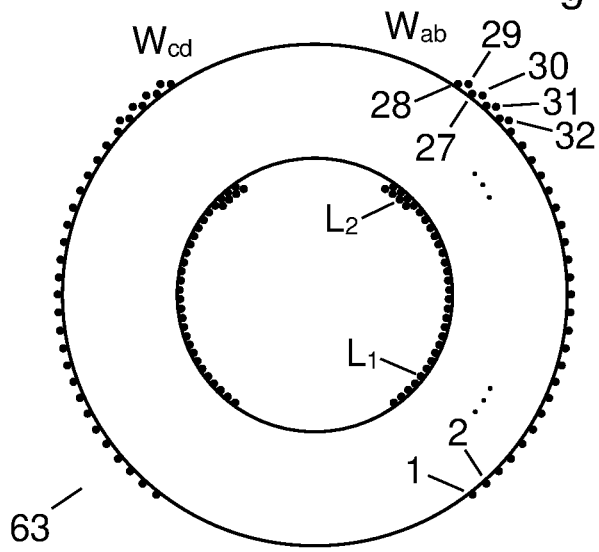
Figure 8E:
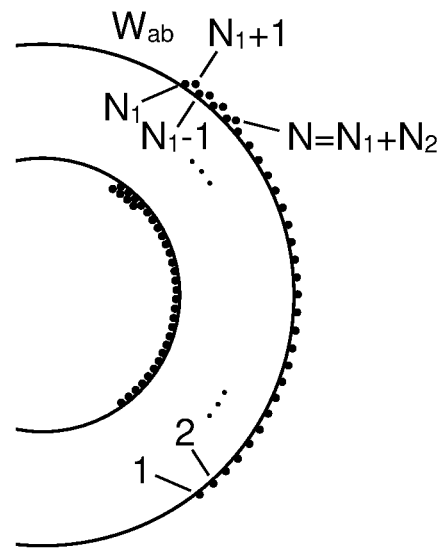
Figure 8D:
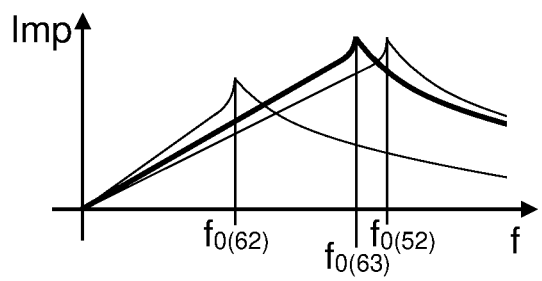
Figure 8C:
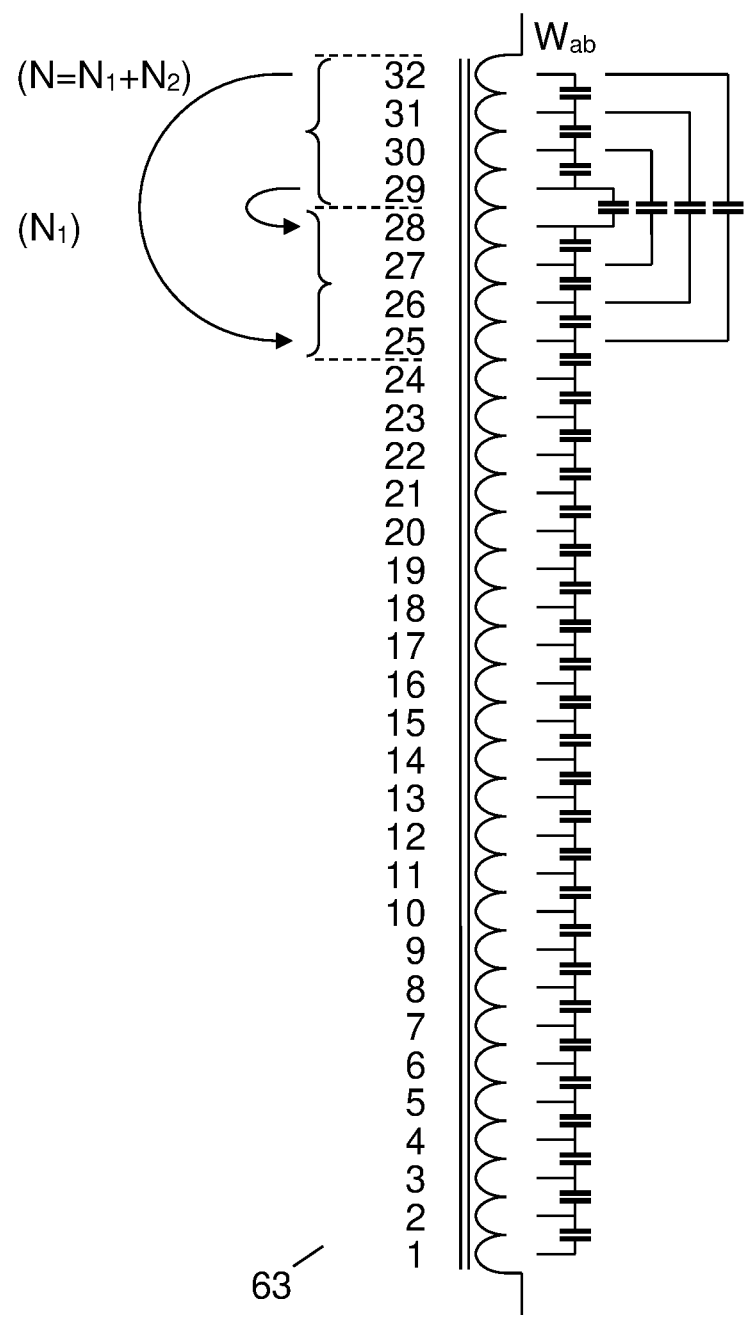

In FIGS. 8a, 8b and 8c, turn number 29 is wound directly around turn number 28, and then turn number 30 around turn number 27, and so on. In other words, the second layer consists of turns number 29 to 32, and the section of the first layer on which the second layer of turns is wound consists of turns number 25 to 28. Thus, the second layer $L_2$ is arranged at the end of the first layer $L_1$. With this arrangement of the second layer, the difference between the highest number of a turn in the second layer and the lowest number of a turn in the section of the first layer on which the second layer of turns is wound is kept small. Thus, also the total capacitance in parallel to each winding of the common mode choke is kept low, which results in a higher resonance frequency. It is noted that with $N_1=28$ turns in the first layer and $N_2=4$ turns in the second layer, the fraction of the first layer that is covered by the second layer, i.e. the relation $N_2/N_1$, is equal to 1/7 or 14.3%. The highest difference between consecutive numbers of turns in the two layers arranged on top of each other is 32−25=7, which corresponds to 25% of the number $N_1=28$ of turns in the first layer.

Similarly to above, the capacitor of size $C_{turn}$ indicating the parasitic capacitance between turn number 32 and turn number 25 will here be the dominating capacitance of the combination of series/parallel-coupled capacitors, and the resulting capacitance of this combination can again be approximated to $C_{turn}$.

Thus, the total capacitance in parallel to the winding $W_{ab}$ of the common mode choke 63 is a series connection of 24 capacitors of size $C_{turn}$ and the combination of series/parallel-coupled capacitors, which as mentioned is also approximated to $C_{turn}$, i.e. the total capacitance can be calculated to 1/25 $C_{turn}$.

Each winding of the common mode choke 63 has 32 turns, and the inductance $L_{32}$ of one of the windings is $L_{32}=(32/28)^2 L_{28}$, while the total capacitance in parallel to the winding as mentioned can be approximated to $C_{turn}/25$. The resonance frequency $f_0$ for the choke 63 will thus be $$f_{0(63)} = \frac{1}{2\pi\sqrt{\frac{1}{25}\left(\frac{32}{28}\right)^2 L_{28} C_{turn}}}.$$

This means that the common mode choke 63 has a resonance frequency that is around 0.84 times the resonance frequency of the choke 52. FIG. 8d shows the impedance of the common mode choke 63 (thick line) as a function of the frequency compared to the impedance of the common mode chokes 52 and 62 (thin line). Compared to the common mode choke 52, the choke 63 has a slightly higher impedance in the lower end of the frequency range due to the higher number of turns, as it was also intended, and in the higher end of the frequency range, the impedance is only slightly reduced, since the total capacitance in parallel to the winding is only increased from to 1/27 $C_{turn}$ to 1/25 $C_{turn}$.

However, if the four turns of the second layer had been arranged e.g. on the middle part of the first layer, as it was the case in FIGS. 6a-6e, the relation $N_2/N_1$ would still be equal to 1/7 or 14.3%, but the highest difference between consecutive numbers of turns in the layers arranged on top of each other would now be 32−13=19, corresponding to 68% of the number $N_1$=28 of turns in the first layer, and the resulting capacitance in parallel to each winding would have been much higher with a corresponding effect on the resonance frequency and the common mode noise reduction.

The more general case with a common mode choke having N turns arranged with $N_1$ turns in the first layer $L_1$ and $N_2$ turns in the second layer $L_2$ is illustrated in FIG. 8e. Here, the second layer consists of turns number $N_1+1$ to $N_1+N_2$ (=N), and the section of the first layer on which the second layer of turns is wound consists of turns number $N_1-N_2$ to $N_1$. Thus, the difference between the highest number $(N_1+N_2)$ of a turn in the second layer and the lowest number $(N_1-(N_2-1))$ of a turn in the section of the first layer on which the second layer of turns is wound is $(N_1+N_2)-(N_1-(N_2-1))=2N_2-1$.

Figure 8F:
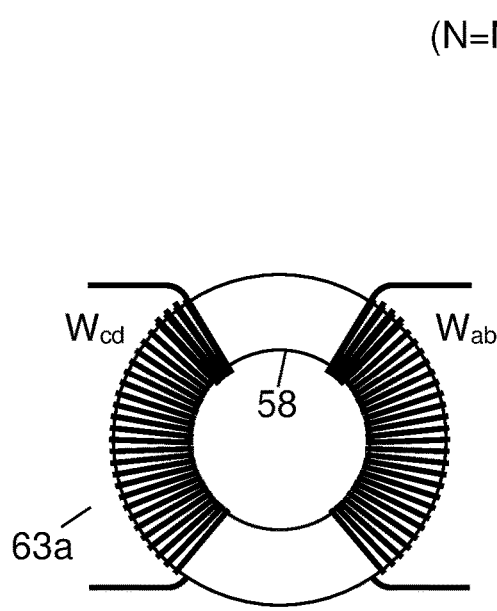
Figure 8G:
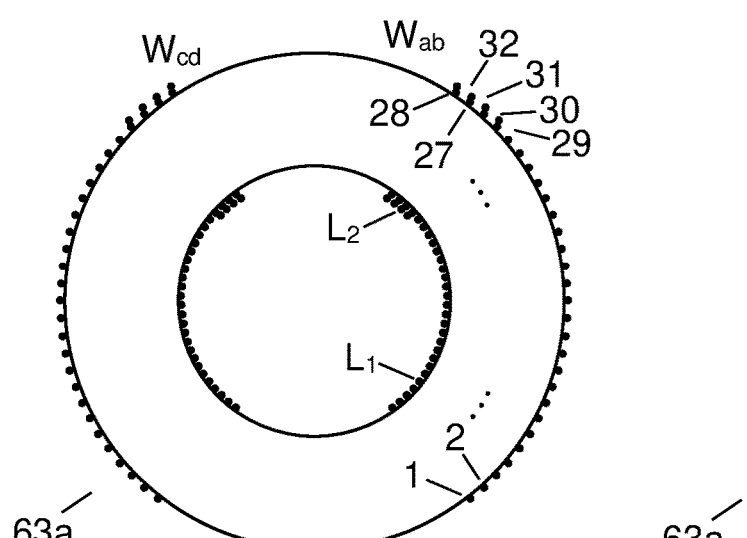
Figure 8H:
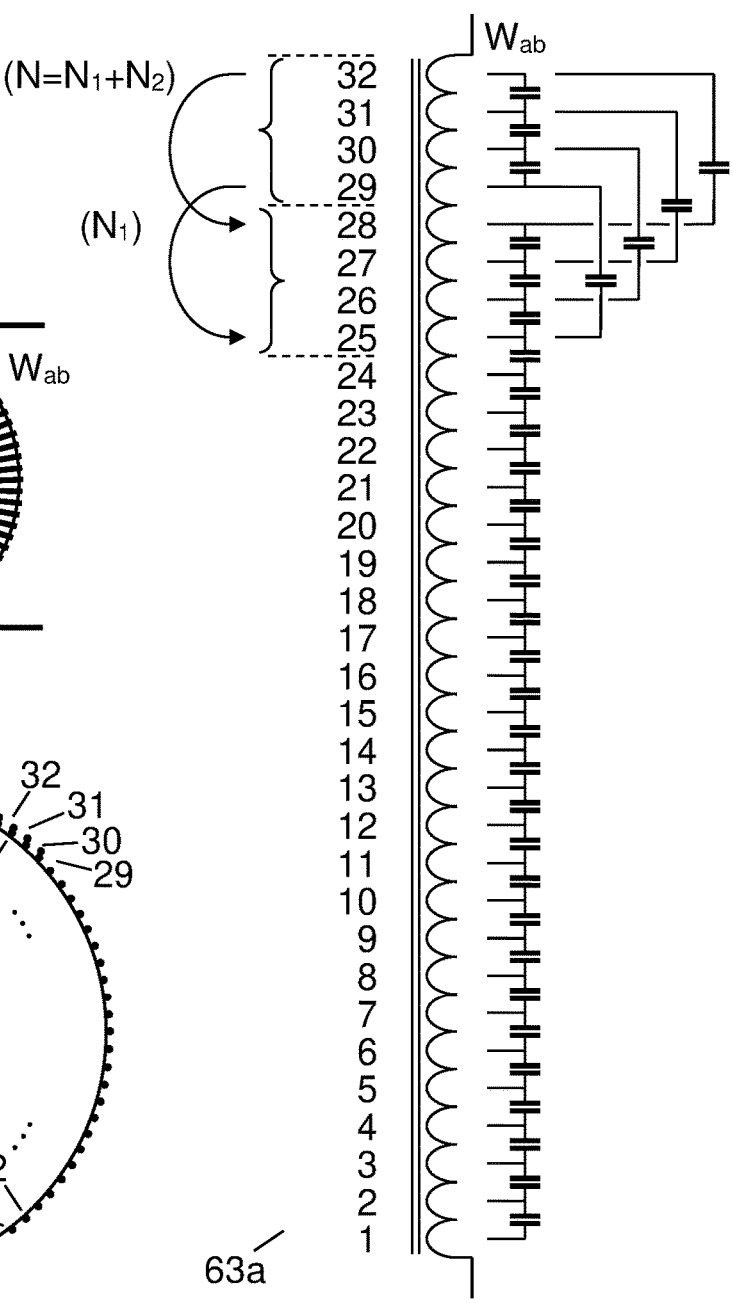

It is noted that the turns of the second layer, i.e. turns number 29, 30, 31 and 32, may also be arranged in the reverse order as that shown in FIGS. 8a-8d. In that case, turn number 29 is wound around turn number 25, and then turn number 30 around turn number 26, and so on, as it is illustrated in FIGS. 8f-8h. Although the combination of series/parallel-coupled capacitors shown in FIG. 8h is different from that of FIG. 8c, the resulting capacitance of the combination can still be approximated to $C_{turn}$, so that also in this case, the total capacitance in parallel to each winding of the common mode choke is determined by the difference between the highest number (32) of a turn in the second layer and the lowest number (25) of a turn in the section of the first layer on which the second layer of turns is wound. Thus, the resonance frequency, the impedance and the common mode noise reduction will also be substantially unchanged.

As mentioned, the common mode choke 64 shown in FIGS. 9a-9d has 35 turns arranged with 28 turns in the first layer $L_1$ and 7 turns in the second layer $L_2$. Again, turn number 29 is wound directly around turn number 28, and then turn number 30 around turn number 27, and so on. Thus, the second layer consists of turns number 29 to 35, and the section of the first layer on which the second layer of turns is wound consists of turns number 22 to 28. In this case, with $N_1$=28 turns in the first layer and $N_2$=7 turns in the second layer, the relation $N_2/N_1$ is equal to 1/4 or 25%, and the highest difference between consecutive numbers of turns in the two layers arranged on top of each other is 35−22=13, which corresponds to 46.4% of the number $N_1$=28 of turns in the first layer.

Similarly to above, the capacitor of size $C_{turn}$ indicating the parasitic capacitance between turn number 35 and turn number 22 will here be the dominating capacitance of the combination of series/parallel-coupled capacitors, and the resulting capacitance of this combination can be approximated to $C_{turn}$.

Thus, the total capacitance in parallel to the winding $W_{ab}$ of the common mode choke 64 is a series connection of 21 capacitors of size $C_{turn}$ and the combination of series/parallel-coupled capacitors, which as mentioned is also approximated to $C_{turn}$, i.e. the total capacitance can be calculated to 1/22 $C_{turn}$.

Each winding of the common mode choke 64 has 35 turns, and the inductance $L_{35}$ of one of the windings is $L_{35}=(35/28)^2 L_{28}$, while the total capacitance in parallel to the winding as mentioned can be approximated to $C_{turn}/22$. The resonance frequency $f_0$ for the choke 64 will thus be $$f_{0(64)} = \frac{1}{2\pi\sqrt{\frac{1}{22}\left(\frac{35}{28}\right)^2 L_{28} C_{turn}}}.$$

This means that the common mode choke 64 has a resonance frequency that is around 0.72 times the resonance frequency of the choke 52. FIG. 9d shows the impedance of the common mode choke 64 (thick line) as a function of the frequency compared to the impedance of the common mode chokes 52 and 62 (thin line). Compared to the common mode choke 63 (FIG. 8d), the choke 64 has a further improved impedance in the lower end of the frequency range due to the higher number of turns. In the higher end of the frequency range, the impedance is a bit further reduced, since the total capacitance in parallel to the winding is increased from to 1/25 $C_{turn}$ to 1/22 $C_{turn}$, but the common mode noise reduction is still at an acceptable level.

Figure 9A:
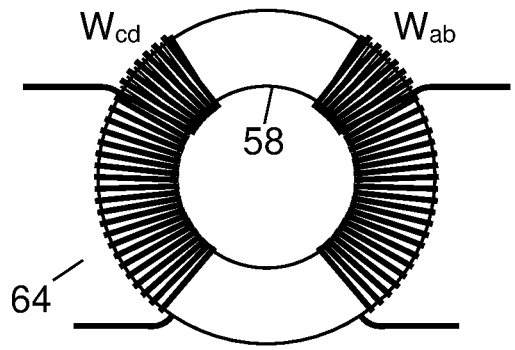
FIGS. 9a to 9d show a side view, a sectional view, an electrical diagram and the impedance as a function of the frequency of another common mode choke having the turns of the windings wound in two layers according to the invention.
Figure 9B:
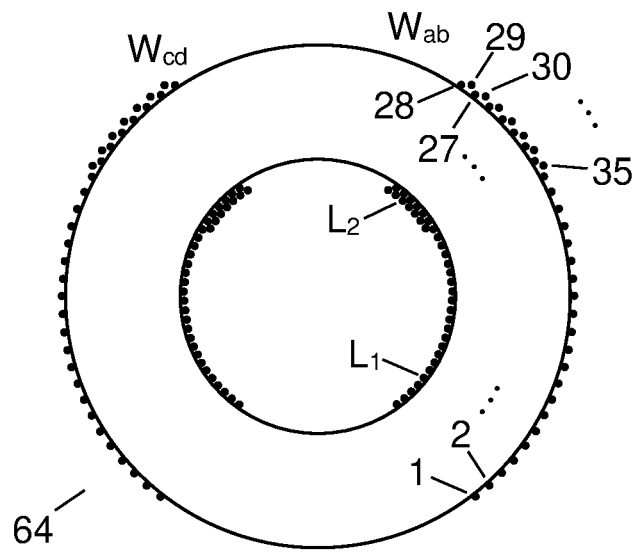
Figure 9D:
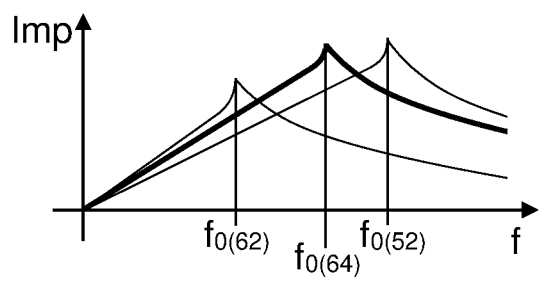
Figure 9C:
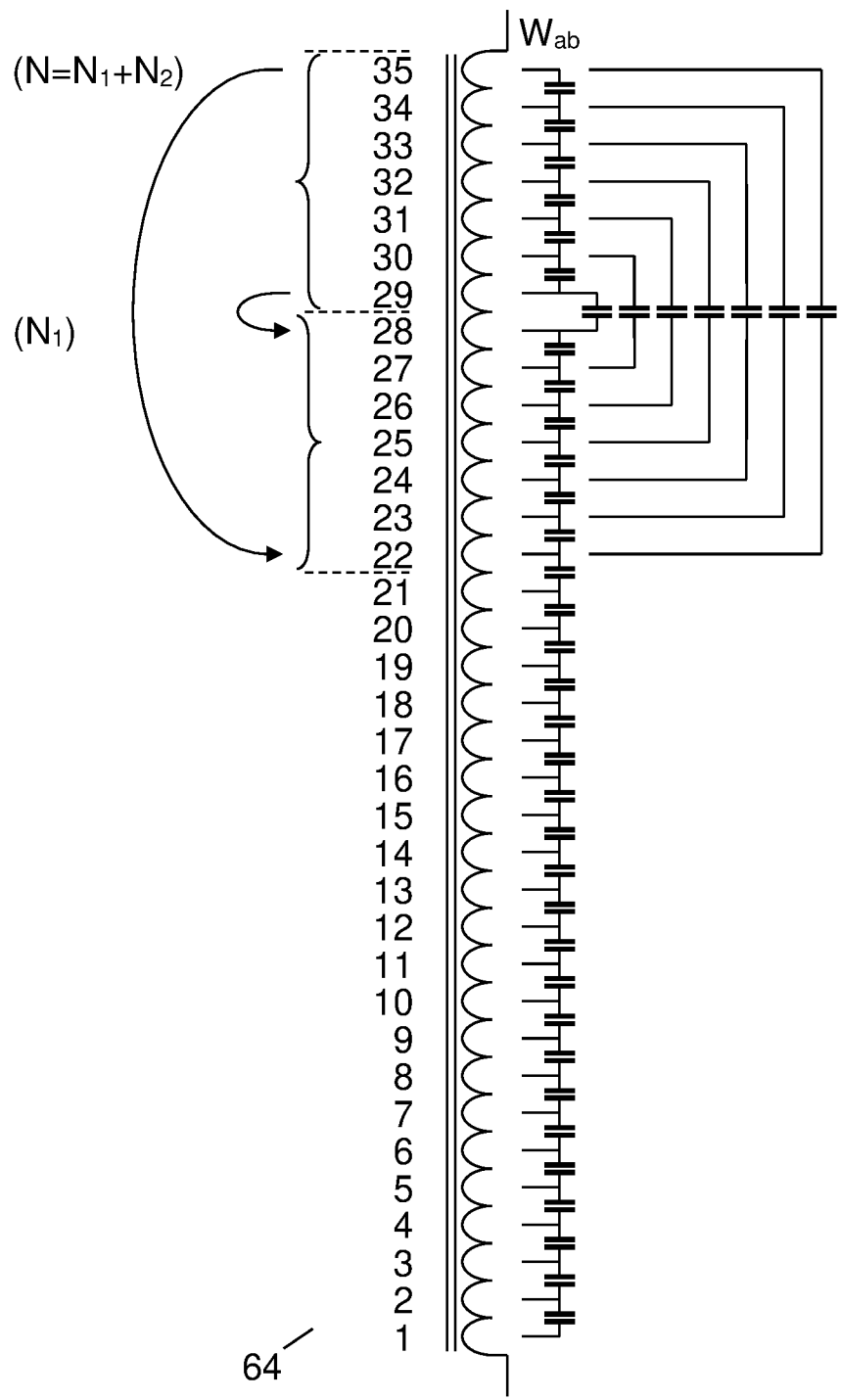

Also here, the turns of the second layer $L_2$, i.e. turns number 29 to 35, may be arranged in the reverse order as that shown in FIGS. 9a-9c.

However, if the number of turns in the second layer $L_2$ is further increased, so that the highest difference between the consecutive numbers of one of the turns in the second layer and one of the turns in the section of the first layer on which the turns of the second layer are arranged exceeds 50% of the number $N_1$ of turns in the first layer, it can be seen that the total capacitance in parallel to the winding will reach a level where the impedance in the higher end of the frequency range is too low and the common mode noise reduction no longer at an acceptable level. This is illustrated in FIGS. 10a-10d showing a common mode choke 65 having 40 turns arranged with 28 turns in the first layer $L_1$ and 12 turns in the second layer $L_2$, i.e. the same number of turns as the common mode choke 62 of FIGS. 6a-6e.

As in FIGS. 8a-8d and 9a-9d, turn number 29 is wound directly around turn number 28, and then turn number 30 around turn number 27, and so on. Thus, the second layer consists of turns number 29 to 40, and the section of the first layer on which the second layer of turns is wound consists of turns number 17 to 28. With $N_1$=28 turns in the first layer and $N_2$=12 turns in the second layer, the relation $N_2/N_1$ is equal to 3/7 or 42.9%, and the highest difference between consecutive numbers of turns in the two layers arranged on top of each other is 40−17=23, which corresponds to 82.1% of the number $N_1$=28 of turns in the first layer.

Here, the capacitor of size $C_{turn}$ indicating the parasitic capacitance between turn number 40 and turn number 17 will be the dominating capacitance of the combination of series/parallel-coupled capacitors, and again the resulting capacitance of this combination can be approximated to $C_{turn}$. Thus, the total capacitance in parallel to the winding $W_{ab}$ of the common mode choke 65 is a series connection of 16 capacitors of size $C_{turn}$ and the combination of series/parallel-coupled capacitors, which as mentioned is also approximated to $C_{turn}$, i.e. the total capacitance can be calculated to 1/17 $C_{turn}$.

Each winding of the common mode choke 65 has 40 turns, and the inductance $L_{40}$ of one of the windings is $L_{40}=(40/28)^2 L_{28}$, while the total capacitance in parallel to the winding as mentioned can be approximated to $C_{turn}/17$. The resonance frequency $f_0$ for the choke 65 will thus be $$f_{0(65)} = \frac{1}{2\pi\sqrt{\frac{1}{17}\left(\frac{40}{28}\right)^2 L_{28} C_{turn}}}.$$

Figure 10A:
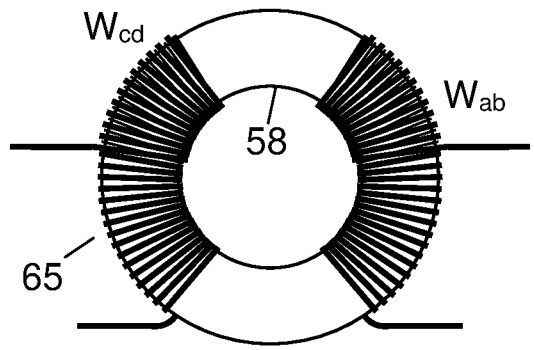
FIGS. 10a to 10d show a side view, a sectional view, an electrical diagram and the impedance as a function of the frequency of a common mode choke having the turns of the windings wound in two layers similar to FIGS. 9a to 9d and FIGS. 10a to 10d but with too many turns in the second layer.
Figure 10B:
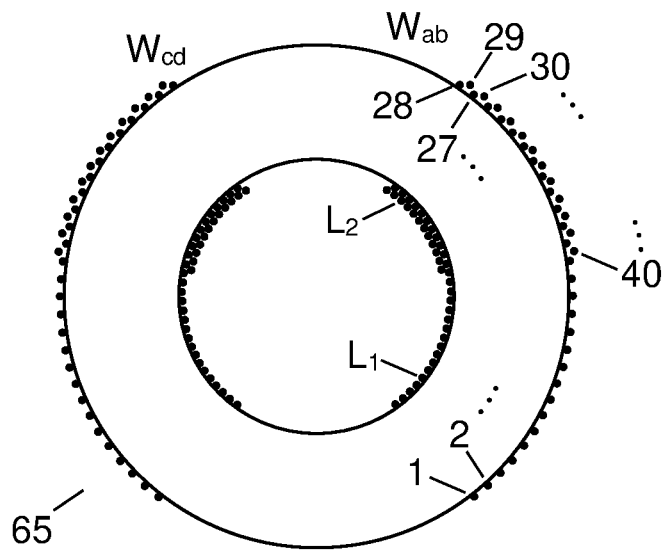
Figure 10D:
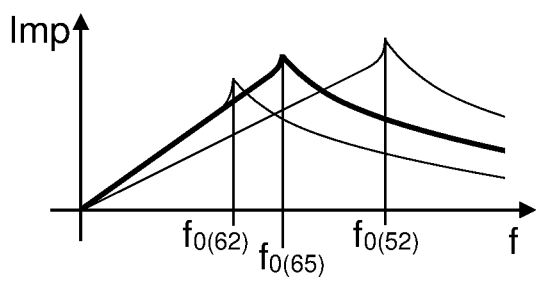
Figure 10C:
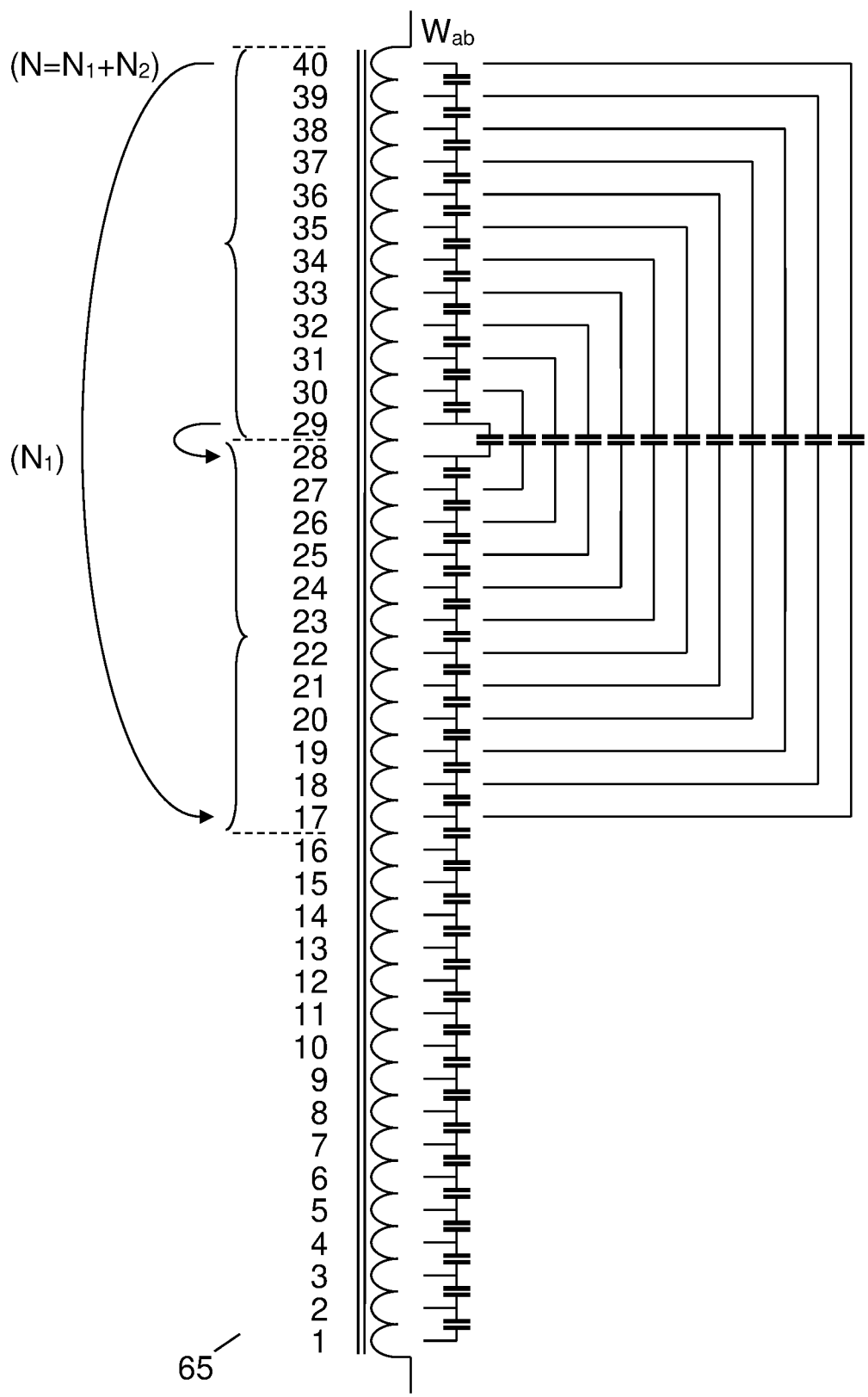

This means that the common mode choke 64 has a resonance frequency that is around 0.56 times the resonance frequency of the choke 52. FIG. 10*d* shows the impedance of the common mode choke 65 (thick line) as a function of the frequency compared to the impedance of the common mode chokes 52 and 62 (thin line). It can be seen that the choke 65 has a further improved impedance in the lower end of the frequency range due to the higher number of turns. Thus, a good common mode noise reduction is achieved in this frequency range. However, since the total capacitance in parallel to the winding is now increased to $\frac{1}{17} C_{turn}$, the impedance in the higher end of the frequency range is reduced to a level around 63% of the corresponding impedance level of the choke 52 from FIGS. 6*a*-6*e*, and the common mode noise reduction is no longer at an acceptable level in this frequency range.

However, if a higher number of turns, e.g. the 40 turns used in the common mode chokes 62 and 65 shown in FIGS. 6*a*-6*e* and 10*a*-10*d*, is needed to achieve a sufficient common mode noise reduction in the lower end of the frequency range, the common mode noise reduction in the higher end of the frequency range can be improved by arranging the turns of the choke in more than two layers, so that the highest difference between consecutive numbers of turns in layers arranged on top of each other can still be kept below 50% of the number $N_1$ of turns in the first layer.

This is illustrated in FIGS. 11*a*-11*d* showing a common mode choke 66 having 40 turns arranged with 28 turns in the first layer $L_1$, 6 turns in the second layer $L_2$ and 6 turns in a third layer $L_3$. Thus, the choke 66 has the same number of turns as the common mode choke 62 of FIGS. 6*a*-6*e* and the common mode choke 65 of FIGS. 10*a*-10*d*.

As in the previous figures, turn number 29 is wound directly around turn number 28, and then turn number 30 around turn number 27, and so on until turn number 34 that is wound around turn number 23. In the third layer, turn number 35 is now wound around turn number 34 in the second layer, and then turn number 36 around turn number 33, and so on until turn number 40 that is wound around turn number 29. With $N_1$=28 turns in the first layer $L_1$, $N_2$=6 turns in the second layer $L_2$ and $N_3$=6 turns in the third layer $L_3$, the relations $N_2/N_1$ and $N_3/N_1$ are equal to $6/28$ or 21.4%. Thus, only 21.4% of the first layer is covered by turns of the other layers. The highest difference between consecutive numbers of turns in layers arranged on top of each other is 40−29=11 and 34−23=11, which corresponds to 39.3% of the number $N_1$=28 of turns in the first layer. This is well below 50% of the number $N_1$ of turns in the first layer, and as shown below, a good common mode noise reduction can be achieved.

Figure 11A:
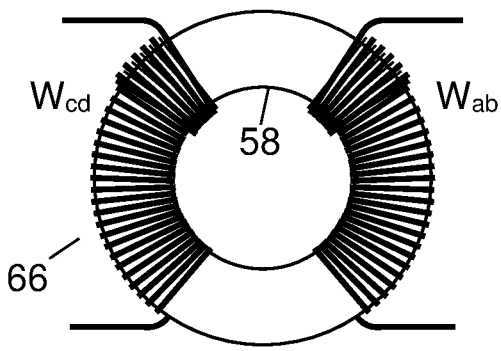
FIGS. 11a to 11d show a side view, a sectional view, an electrical diagram and the impedance as a function of the frequency of a common mode choke having the turns of the windings wound in three layers according to the invention.
Figure 11B:
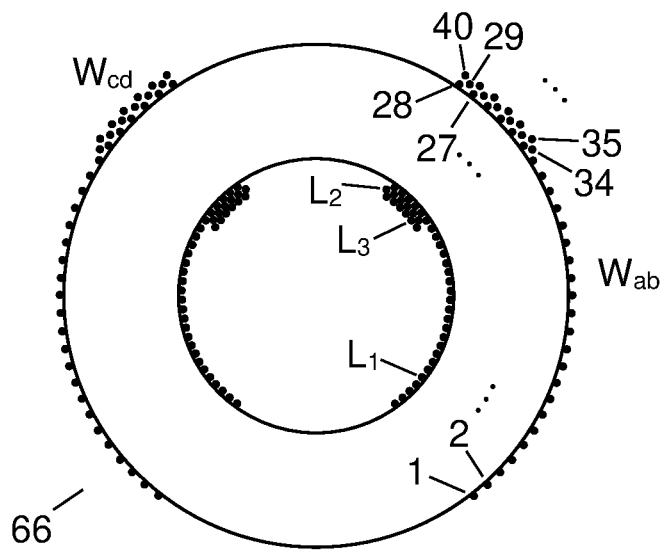
Figure 11D:
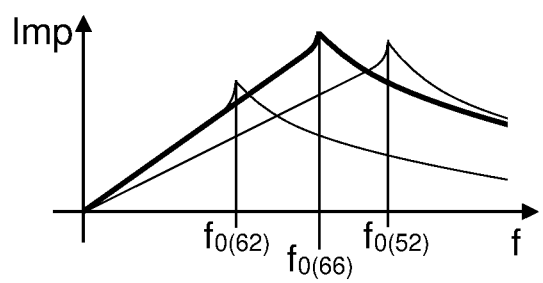
Figure 11C:
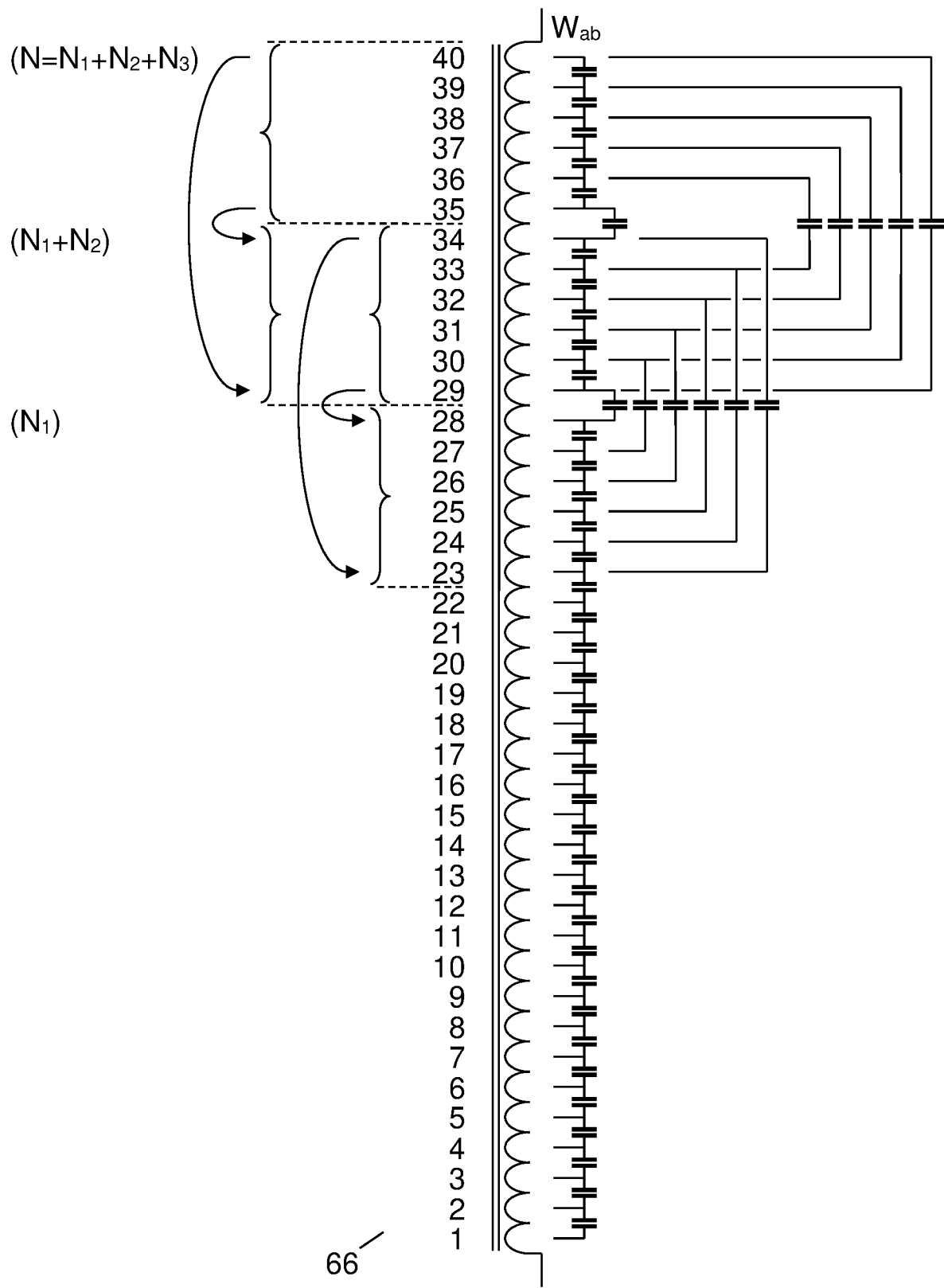

The fact that the turns of the windings are now wound in three layers means that in addition to the parasitic capacitance or stray capacitance between neighbouring turns in each layer and between a given turn in the first layer and its neighbouring turn in the second layer, i.e. the turn above or below that turn, there will now also be a parasitic capacitance between a given turn in the second layer and its neighbouring turn in the third layer. This is illustrated in FIG. 11*c*. Theoretically, there will also be a parasitic capacitance between a turn in the third layer and the turn in the first layer arranged below that turn, e.g. between turn number 35 in the third layer and turn number 23 in the first layer, but due to the larger distance between these turns, these capacitances can be considered as negligible compared to the capacitance between turns arranged directly above each other.

Here, the capacitors of size $C_{turn}$ indicating the parasitic capacitances between turn number 40 and turn number 29 and between turn number 34 and turn number 23 will now be the dominating capacitances of the combination of series/parallel-coupled capacitors, and again the resulting capacitance of this combination can be approximated to $C_{turn}$. Thus, the total capacitance in parallel to the winding $W_{ab}$ of the common mode choke 66 is a series connection of 22 capacitors of size $C_{turn}$ and the combination of series/parallel-coupled capacitors, which as mentioned is also approximated to $C_{turn}$, i.e. the total capacitance can be calculated to $\frac{1}{23} C_{turn}$.

Each winding of the common mode choke 66 has 40 turns, and the inductance $L_{40}$ of one of the windings is $L_{40}=(40/28)^2 L_{28}$, while the total capacitance in parallel to the winding as mentioned can be approximated to $C_{turn}/23$. The resonance frequency $f_0$ for the choke 66 will thus be $$f_{0(66)} = \frac{1}{2\pi\sqrt{\frac{1}{23}\left(\frac{40}{28}\right)^2 L_{28} C_{turn}}}.$$

This means that the common mode choke 66 has a resonance frequency that is around 0.65 times the resonance frequency of the choke 52. FIG. 11*d* shows the impedance of the common mode choke 66 (thick line) as a function of the frequency compared to the impedance of the common mode chokes 52 and 62 (thin line).

It can be seen that compared to the common mode choke 52, the choke 66 has an improved impedance in the lower end of the frequency range due to the higher number of turns. Thus, a good common mode noise reduction is achieved in this frequency range. In the higher end of the frequency range, the impedance is now only slightly reduced, since the total capacitance in parallel to the winding is only increased from to $\frac{1}{27} C_{turn}$ to $\frac{1}{23} C_{turn}$. This means that the common mode choke 66 has a good common mode noise reduction in the lower frequency range as well as the higher frequency range. Especially around its resonance frequency $f_0$ (66) the common mode choke 66 has a common mode noise reduction that is considerably better than it was the case for the previously described chokes.

Also here, the turns of the second layer $L_2$ and/or the third layer $L_3$, i.e. turns number 29 to 34 and/or turns number 35 to 40, may be arranged in the reverse order as that shown in FIGS. 11*a*-11*d* without changing the common mode noise reduction essentially.

As mentioned, the common mode choke 66 has 40 turns arranged with 28 turns in the first layer $L_1$, 6 turns in the second layer $L_2$ and 6 turns in the third layer $L_3$, and the highest difference between consecutive numbers of turns arranged in two layers on top of each other is 11, which corresponds to 39.3% of the number of turns in the first layer. If a higher total number of turns is needed, the number of turns in the second and/or third layer can be increased. As long as the highest difference between consecutive numbers of turns arranged in layers on top of each other does not exceed 50% of the number turns in the first layer, the common mode noise reduction in the higher end of the frequency range will be acceptable. Thus, as an example, the common mode choke 66 of FIGS. 11a-11d could be modified to have 7 turns in each of the second and third layers without exceeding the 50% limit.

In case the total number of turns should be further increased, the use of four or even more layers could be considered.

In the embodiments described above and shown in FIGS. 8a-8e, 9a-9d and 11a-11d, the first layer $L_1$ consists of the turns consecutively numbered from 1 to 28 or more generally from 1 to $N_1$, while the turns having higher numbers are arranged in the second and/or third layers. This means that when the common mode choke is manufactured, the first $N_1$ turns are wound directly on the core as the first layer, and then higher-numbered turns are wound as the second layer on top of those turns of the first layer having numbers closest to $N_1$, and, if necessary, as a third layer on top of the second layer. However, the turns do not necessarily need to be arranged in this way. Other arrangements are possible, which will still ensure that the highest difference between consecutive numbers of turns arranged in layers on top of each other does not exceed 50% of the number turns in the first layer, so that the common mode noise reduction in the higher end of the frequency range will be acceptable.

As an example of this, FIGS. 12a-12d show a common mode choke 67 having 35 turns arranged with 28 turns in the first layer $L_1$ and 7 turns in the second layer $L_2$, i.e. the same number of turns as the common mode choke 64 of FIGS. 9a-9d. However, here the turns consecutively numbered from 1 to 17 have first been wound as a part of the first layer $L_1$ directly on the core, but then, as a step backwards, the turns number 18 to 24 have been wound as the second layer $L_2$ around turns number 11 to 17 in the first layer, with turn number 18 being wound directly around turn number 11, and then turn number 19 around turn number 12, and so on. Finally, the first layer has been continued with turns number 25 to 35. Thus, the second layer $L_2$ consisting of turns number 18 to 24 is here arranged in the middle of the first layer $L_1$ consisting of turns number 1 to 17 and 25 to 35.

Figure 12A:
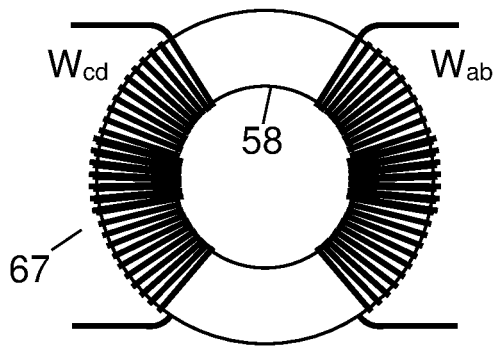
FIGS. 12a to 12e show a side view, sectional views, an electrical diagram and the impedance as a function of the frequency of a further common mode choke having the turns of the windings wound in two layers according to the invention.
Figure 12B:
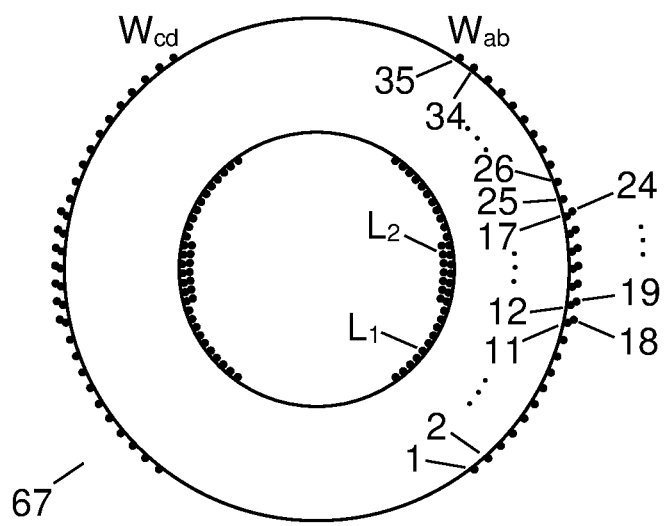
Figure 12E:
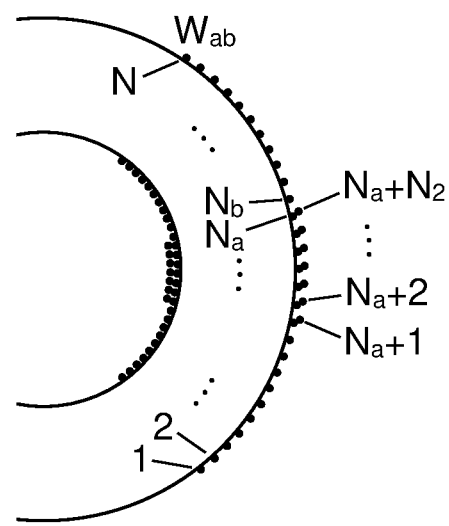
Figure 12D:
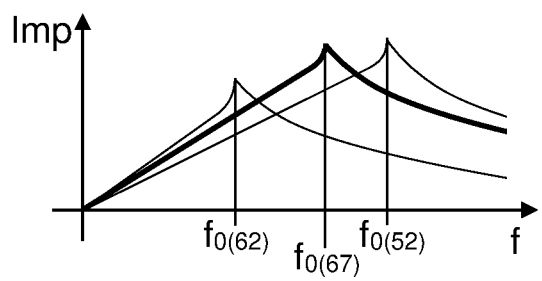
Figure 12C:
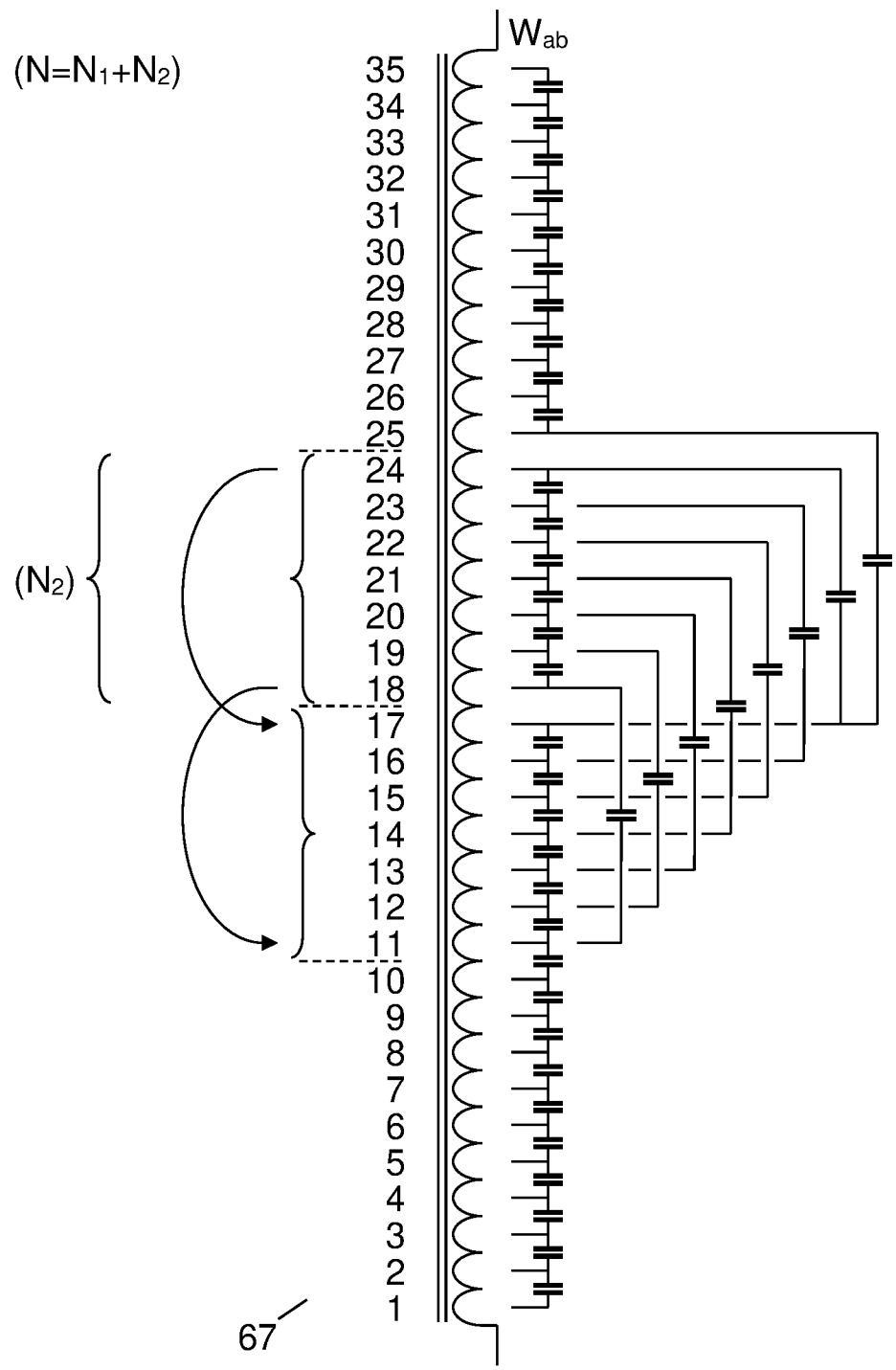

FIG. 12c shows how the turns of the common mode choke 67 are capacitively coupled to each other. As it was the case for the common mode choke 64 of FIGS. 9a-9d, with $N_1$=28 turns in the first layer and $N_2$=7 turns in the second layer, the relation $N_2/N_1$ is equal to ¼ or 25%. The highest difference between consecutive numbers of turns that are arranged in layers on top of each other is 24−11=13, which corresponds to 46.4% of the number $N_1$=28 of turns in the first layer.

Similarly to above, the resulting capacitance of the combination of series/parallel-coupled capacitors can be approximated to $C_{turn}$. Thus, the total capacitance in parallel to the winding $W_{ab}$ of the common mode choke 67 is a series connection of 21 capacitors of size $C_{turn}$ and the combination of series/parallel-coupled capacitors, which as mentioned is also approximated to $C_{turn}$, i.e. the total capacitance can be calculated to ½2 $C_{turn}$.

Thus, each winding of the common mode choke 67 (as it was the case for the common mode choke 64) has 35 turns, and the inductance $L_{35}$ of one of the windings is $L_{35}$=(35/28)² $L_{28}$, while the total capacitance in parallel to the winding as mentioned can be approximated to $C_{turn}/22$. The resonance frequency $f_0$ for the choke 67 will thus be the same as for the choke 64, i.e.

$$f_{0(67)} = \frac{1}{2\pi\sqrt{\frac{1}{22}\left(\frac{35}{28}\right)^2 L_{28} C_{turn}}}.$$

This means that the impedance of the common mode choke 67 shown in FIG. 12d is the same as that of the common mode choke 64 shown in FIG. 9d. Thus, also the common mode noise reduction of the common mode choke 67 is at an acceptable level. Although the common mode choke 67 seen from the outside (see FIG. 12a) may look very similar to the common mode choke 62 (see FIG. 6a) because the turns of the second layer are arranged in the middle of the first layer, the order of the turns is very different, and so is the resulting common mode noise reduction.

Also here, the turns of the second layer $L_2$, i.e. turns number 18 to 24, may be arranged in the reverse order as that shown in FIGS. 12a-12c.

As mentioned above, in the common mode choke 67 shown in FIGS. 12a-12c the second layer $L_2$ consisting of turns number 18 to 24 is arranged in the middle of the first layer $L_1$ consisting of turns number 1 to 17 and 25 to 35, so that the turns of the second layer $L_2$ are wound around turns number 11 to 17. However, the impedance and thus also the common mode noise reduction of the common mode choke 67 will be unchanged if the turns of the second layer are not arranged in the middle of the first layer. Thus as examples, the second layer could consist of turns number 13 to 19 wound around turns number 6 to 12 or turns number 25 to 31 wound around turns number 18 to 24.

More generally, as it is illustrated in FIG. 12e, the first layer $L_1$ can here be considered as comprising two sections, i.e. a first section consisting of turns numbered from 1 to a first intermediate turn number $N_a$ and a second section consisting of turns numbered from a second intermediate turn number $N_b$ to the total number of turns N, which is also here equal to $N_1+N_2$. Naturally, the second intermediate turn number $N_b$ is higher than the first intermediate turn number $N_a$. The second layer $L_2$ thus consists of the $N_2$ turns from number $N_a+1$ to $N_a+N_2$, and it is wound around the highest numbered turns of the first section of the first layer, i.e. turn number $N_a$ and the turn numbers just below turn number $N_a$.

The common mode chokes 63, 63a, 64, 66 and 67 shown in FIGS. 8a-8h, 9a-c, 11a-c and 12a-c have their windings ($W_{ab}$; $W_{cd}$) arranged on a toroidal core (58), but as mentioned above, the windings may also be arranged on differently shaped magnetic cores, such as a rectangular-shaped core (as shown in FIG. 2b), cores shaped as a straight cylindrical rod (as shown in FIG. 2c) or other shapes.

The two windings $W_{ab}$ and $W_{cd}$ may also be arranged differently in relation to each other instead of being arranged symmetrically and opposite to each other as shown in FIGS. 8a-8h, 9a-c, 11a-c and 12a-c. Thus, they may be arranged closer to each other, or they may be partly or fully overlapping. The turns of the two windings may also be interleaved with each other. Further, it is noted that the common mode choke may also have more than two windings, e.g. if the choke is designed to be used with a three-phase mains AC supply net. In all cases, the turns of each winding should be arranged as described above.

Further, in the common mode chokes 63, 63a, 64, 66 and 67 shown in FIGS. 8a-8h, 9a-c, 11a-c and 12a-c, the turns of the layers are wound with the same (or opposite) pitch. Thus, if there are e.g. seven turns in the second layer, there will also be seven turns in the section of the first layer on which the second layer is wound, which will often be the case. However, this is not a requirement for the invention. The layers may just as well be wound with different pitches. As an example, in the choke 63 of FIGS. 8a-8c the second layer $L_2$ consisting of the four turns number 29 to 32 could be wound with a higher pitch than the first layer $L_1$, so that the section of the first layer on which the second layer is wound consists of the eight turns number 21 to 28. As long as the difference between the highest number of a turn in the second layer and the lowest number of a turn in the section of the first layer on which the second layer is wound is less than or equal to 50% of the number of turns in the first layer, the common mode noise reduction will be acceptable.

In other words, there is disclosed a common mode choke $63$; $63a$; $64$; $66$; $67$ comprising a magnetic core $58$; a first winding $W_{ab}$ of insulated wire having a number of turns wound on said magnetic core; and a second winding $W_{cd}$ of insulated wire having the same number of turns as the first winding wound on said magnetic core, wherein the turns of each winding $W_{ab}$; $W_{cd}$ are numbered consecutively; and the turns of each winding $W_{ab}$; $W_{cd}$ are arranged in at least two layers, of which a first layer $L_1$ of turns is wound directly on said magnetic core and a second layer $L_2$ of turns is wound around a section of said first layer. The two layers of each winding $W_{ab}$; $W_{cd}$ are arranged such that the difference between the highest number of a turn in the second layer $L_2$ and the lowest number of a turn in the section of the first layer $L_1$ on which the second layer $L_2$ is wound is less than or equal to 50% of the number of turns in the first layer $L_1$ of that winding.

When the difference between the highest number of a turn in the second layer and the lowest number of a turn in the section of the first layer on which the second layer is wound does not exceed 50% of the number of turns in the first layer of that winding, the effect of the parasitic capacitance between the layers is minimized, because the remaining turns of the first layer and the parasitic capacitances between them is still dominating in the determination of the resonance frequency and the impedance at the higher end of the frequency range. Thus, the need for a larger core of the common mode choke can be eliminated, which may result in a smaller, more elegant and less expensive enclosure of the device in which the common mode choke is used.

In an embodiment, the first layer $L_1$ consists of turns having consecutive numbers from turn number one to the number of turns $N_1$ in the first layer $L_1$; the second layer $L_2$ consists of turns having consecutive numbers higher than the number of turns $N_1$ in the first layer $L_1$; and the section of the first layer $L_1$ on which the second layer $L_2$ is wound comprises the highest numbered turns of the first layer $L_1$. By arranging the second layer at the end of the first layer, a practical solution is achieved.

The turns of the second layer $L_2$ may be arranged with the lowest numbered turn $N_1+1$ wound around the highest numbered turn $N_1$ of the first layer $L_1$ and with numbers increasing in the direction away from this turn. Alternatively, the turns of the second layer $L_2$ may be arranged with the highest numbered turn $N_1+N_2$ wound around the highest numbered turn $N_1$ of the first layer $L_1$ and with numbers decreasing in the direction away from this turn.

The effect of the parasitic capacitance between the layers can be further minimized, and the resonance frequency and the impedance at the higher end of the frequency range thus further improved, when the turns of each winding are arranged in at least three layers, wherein a third layer $L_3$ of turns is wound around at least a section of said second layer $L_2$.

In an embodiment, the first layer $L_1$ comprises two sections of turns, a first section consisting of turns having consecutive numbers below a first intermediate turn number $N_a$ and a second section consisting of turns having consecutive numbers above a second intermediate turn number $N_b$, where said second intermediate turn number $N_b$ is higher than said first intermediate turn number $N_a$; the second layer $L_2$ consists of turns having consecutive numbers between said first intermediate turn number $N_a$ and said second intermediate turn number $N_b$; and the section of the first layer $L_1$ on which the second layer $L_2$ is wound comprises the highest numbered turns of the first section of the first layer $L_1$. In this way, the second layer of turns can be placed in an arbitrary position on the first layer.

In an embodiment, the section of the first layer $L_1$ on which the second layer $L_2$ is wound has the same number $N_2$ of turns as the second layer $L_2$.

The magnetic core $58$ on which the turns of the windings $W_{ab}$; $W_{cd}$ are wound may be a toroidal core. This type of core is available from many different suppliers. In that case, the windings $W_{ab}$; $W_{cd}$ may be arranged symmetrically on said toroidal core $58$ and separated from each other. This increases the leakage flux between the two windings, and the resulting leakage inductance will ensure that the common mode choke will also have some differential mode impedance, which can provide a certain differential mode suppression as well at higher frequencies.

Although various embodiments of the present invention have been described and shown, the invention is not restricted thereto, but may also be embodied in other ways within the scope of the subject-matter defined in the following claims.

The invention claimed is:

1. A common mode choke ($63$; $63a$; $64$; $66$; $67$) comprising:
   a magnetic core ($58$);
   a first winding ($W_{ab}$) of insulated wire having a number of turns wound on said magnetic core; and
   a second winding ($W_{cd}$) of insulated wire having the same number of turns as the first winding wound on said magnetic core,
   wherein,
   the turns of each winding ($W_{ab}$; $W_{cd}$) are numbered consecutively; and
   the turns of each winding ($W_{ab}$; $W_{cd}$) are arranged in at least two layers, of which a first layer ($L_1$) of turns is wound directly on said magnetic core and a second layer ($L_2$) of turns is wound around a section of said first layer,
   characterized in that
   the first and second layers ($L_1$, $L_2$) of each winding ($W_{ab}$; $W_{cd}$) are arranged such that the difference between the highest number of a turn in the second layer ($L_2$) and the lowest number of a turn in the section of the first layer ($L_1$) on which the second layer ($L_2$) is wound is less than or equal to 50% of the number of turns in the first layer ($L_1$) of that winding and
   the first layer ($L_1$) consists of turns having consecutive numbers from turn number one to the number of turns ($N_1$) in the first layer ($L_1$);
   the second layer ($L_2$) consists of turns having consecutive numbers higher than the number of turns ($N_1$) in the first layer ($L_1$); and
   the section of the first layer ($L_1$) on which the second layer ($L_2$) is wound comprises the highest numbered turns of the first layer ($L_1$).

2. A common mode choke according to claim 1, characterized in that the turns of the second layer ($L_2$) are arranged with the lowest numbered turn ($N_1+1$) wound around the highest numbered turn ($N_1$) of the first layer ($L_1$) and with numbers increasing in the direction away from this turn.

3. A common mode choke according to claim 1, characterized in that the turns of the second layer $L_2$) are arranged with the highest numbered turn ($N_1+N_2$) wound around the highest numbered turn ($N_1$) of the first layer ($L_1$) and with numbers decreasing in the direction away from this turn.

4. A common mode choke according to claim 1, characterized in that the turns of each winding are arranged in at least three layers, wherein a third layer ($L_3$) of turns is wound around at least a section of said second layer ($L_2$).

5. A common mode choke (67) comprising:
a magnetic core (58);
first winding ($W_{ab}$) of insulated wire having a number of turns wound on said magnetic core; and
a second winding ($W_{cd}$) of insulated wire having the same number of turns as the first winding wound on said magnetic core,
wherein
the turns of each winding ($W_{ab}$; $W_{cd}$) are numbered consecutively; and
the turns of each winding ($W_{ab}$; $W_{cd}$) are arranged in at least two layers, of which a first layer ($L_1$) of turns is wound directly on said magnetic core and a second layer ($L_2$) of turns is wound around a section of said first layer,
characterized in that
the first and second layers ($L_1$, $L_2$) of each winding ($W_{ab}$; $W_{cd}$) are arranged such that the difference between the highest number of a turn in the second layer ($L_2$) and the lowest number of a turn in the section of the first layer ($L_1$) on which the second layer ($L_2$) is wound is less than or equal to 50% of the number of turns in the first layer ($L_1$) of that winding, and
the first layer ($L_1$) comprises two sections of turns, a first section consisting of turns having consecutive numbers below a first intermediate turn number ($N_a$) and a second section consisting of turns having consecutive numbers above a second intermediate turn number ($N_b$), where said second intermediate turn number ($N_b$) is higher than said first intermediate turn number ($N_a$);
the second layer ($L_2$) consists of turns having consecutive numbers between said first intermediate turn number ($N_a$) and said second intermediate turn number ($N_b$); and
the section of the first layer ($L_1$) on which the second layer ($L_2$) is wound comprises the highest numbered turns of the first section of the first layer ($L_1$).

6. A common mode choke according to claim 1, characterized in that the section of the first layer ($L_1$) on which the second layer ($L_2$) is wound has the same number ($N_2$) of turns as the second layer ($L_2$).

7. A common mode choke according to claim 1, characterized in that said magnetic core (58) on which the turns of the windings ($W_{ab}$; $W_{cd}$) are wound is a toroidal core.

8. A common mode choke according to claim 7, characterized in that the windings ($W_{ab}$; $W_{cd}$) are arranged symmetrically on said toroidal core (58) and separated from each other.

* * * * *